United States Patent [19]
Padovani et al.

[11] Patent Number: 5,568,483
[45] Date of Patent: Oct. 22, 1996

[54] METHOD AND APPARATUS FOR THE FORMATTING OF DATA FOR TRANSMISSION

[75] Inventors: Roberto Padovani; Edward G. Tiedemann, Jr., both of San Diego; Joseph P. Odenwalder, Del Mar, all of Calif.; Ephraim Zehavi, Haifa, Israel; Charles E. Wheatley, III, Del Mar, Calif.

[73] Assignee: Qualcomm Incorporated, San Diego, Calif.

[21] Appl. No.: 374,444

[22] Filed: Jan. 17, 1995

Related U.S. Application Data

[63] Continuation-in-part of Ser. No. 171,146, Dec. 21, 1993, Pat. No. 5,504,773, which is a continuation of Ser. No. 822,164, Jan. 16, 1992, abandoned, which is a continuation-in-part of Ser. No. 543,496, Jun. 25, 1990, Pat. No. 5,103,459.

[51] Int. Cl.⁶ ..................................................... H04J 3/22
[52] U.S. Cl. ............................ 370/84; 370/111; 375/240
[58] Field of Search ................................ 341/61; 348/384, 348/390; 370/79, 82, 84, 99, 102, 110.1, 111; 371/49.1; 381/29, 30; 395/2, 2.1, 2.38; 455/72; 375/240, 241, 249

[56] References Cited

U.S. PATENT DOCUMENTS

| | | | |
|---|---|---|---|
| 3,310,631 | 3/1967 | Brown | 370/110.1 |
| 4,291,409 | 9/1981 | Weinberg et al. | 375/209 |
| 4,688,035 | 8/1987 | Gray et al. | 340/825.52 |
| 4,813,040 | 3/1989 | Futato | 370/111 |
| 5,003,533 | 3/1991 | Watanabe | 370/85.5 |
| 5,022,046 | 6/1991 | Morrow, Jr. | 375/206 |
| 5,068,849 | 11/1991 | Tanaka | 370/85.5 |
| 5,136,586 | 8/1992 | Greenblatt | 370/110.4 |
| 5,150,387 | 9/1992 | Yoshikawa et al. | 375/240 |
| 5,212,684 | 5/1993 | MacNamee et al. | 370/24 |
| 5,218,639 | 6/1993 | Osterweil | 375/240 |
| 5,258,983 | 11/1993 | Lane et al. | 370/118 |
| 5,455,841 | 10/1995 | Hazu | 375/240 |

FOREIGN PATENT DOCUMENTS

| | | |
|---|---|---|
| 0412583 | 2/1991 | European Pat. Off. . |
| 0418865 | 3/1991 | European Pat. Off. . |
| 0444592 | 9/1991 | European Pat. Off. . |
| 2022365 | 12/1979 | United Kingdom . |
| 2182528 | 5/1987 | United Kingdom . |
| 9107030 | 5/1991 | WIPO . |

*Primary Examiner*—Benedict V. Safourek
*Attorney, Agent, or Firm*—Russell B. Miller; Sean English

[57] ABSTRACT

A method and apparatus for arranging various types of data, and at various rates, into a uniquely structured format for transmission. Data for transmission formatting may be vocoder data or different types of non-vocoder data. The data organized into frames of a predetermined time duration for transmission. The data frames are organized, depending on the data, to be at one of several data rates. Vocoder data is provided at one of several data rates and is organized in the frame according to a predetermined format. Frames may be formatted with a sharing of vocoder data with non-vocoder data to be at a highest frame data rate. Different types of non-vocoder data may be organized so as to also be at the highest frame data rate. Additional control data may be provided within the data frames to support various aspects of the transmission and recovery upon reception.

77 Claims, 22 Drawing Sheets

9600 BPS PRIMARY TRAFFIC ONLY

9600 BPS DIM AND BURST WITH RATE 1/2 PRIMARY AND SIGNALING TRAFFIC

9600 BPS DIM AND BURST WITH RATE 1/4 PRIMARY AND SIGNALING TRAFFIC

9600 BPS DIM AND BURST WITH RATE 1/8 PRIMARY AND SIGNALING TRAFFIC

9600 BPS BLANK AND BURST WITH SIGNALING TRAFFIC ONLY 4.8 KBPS FRAME FORMAT 2.4 KBPS FRAME FORMAT 1.2 KBPS FRAME FORMAT

9600 BPS DIM AND BURST WITH RATE 1/2 PRIMARY AND SECONDARY TRAFFIC

9600 BPS DIM AND BURST WITH RATE 1/4 PRIMARY AND SECONDARY TRAFFIC

9600 BPS DIM AND BURST WITH RATE 1/8 PRIMARY AND SECONDARY TRAFFIC

9600 BPS BLANK AND BURST WITH SECONDARY TRAFFIC ONLY

NOTATION
MM  MIXED MODE BIT
TT  TRAFFIC TYPE BIT
TM  TRAFFIC MODE BITS
F  FRAME QUALITY INDICATOR (CRC) BITS
T  ENCODER TAIL BITS

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 384 | 416 | 448 | 480 | 512 | 544 | 576 |

FIG. 5A

| 1 | 17 | 33 | 49 | 65 | 81 | 97 | 113 | 129 | 145 | 161 | 177 | 193 | 209 | 225 | 241 | 257 | 273 |
|---|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 5B

| | | | | | | | | | | | | | | | | |
|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |

FIG. 5C

| | | | | | | | | | | | | | | | | | |
|---|---|---|---|---|---|---|---|---|---|---|---|---|---|---|---|---|---|
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

FIG. 5D

WALSH CHIP WITHIN SYMBOL

| Walsh Symbol Index | 0000 0123 | 0000 4567 | 1111 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

WALSH CHIP WITHIN SYMBOL

| WALSH SYMBOL INDEX | 0123 | 4567 | 11<br>8901 | 1111<br>2345 | 1111<br>6789 | 2222<br>0123 | 2222<br>4567 | 2233<br>8901 | 3333<br>2345 | 3333<br>6789 | 4444<br>0123 | 4444<br>4567 | 4455<br>8901 | 5555<br>2345 | 5555<br>6789 | 6666<br>0123 |
|---|---|---|---|---|---|---|---|---|---|---|---|---|---|---|---|---|
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

FIG. 6C

14400 BPS
PRIMARY TRAFFIC ONLY

14400 BPS
DIM AND BURST
WITH RATE 1/2
PRIMARY AND
SIGNALING
TRAFFIC

14400 BPS
DIM AND BURST
WITH RATE 1/4
PRIMARY AND
SIGNALING
TRAFFIC

14400 BPS
DIM AND BURST
WITH RATE 1/8
PRIMARY AND
SIGNALING
TRAFFIC

14400 BPS
BLANK AND
BURST WITH
SIGNALING
TRAFFIC ONLY

7200 BPS
PRIMARY TRAFFIC ONLY

7200 BPS
DIM AND BURST
WITH RATE 1/4
PRIMARY AND
SIGNALING
TRAFFIC

7200 BPS
DIM AND BURST
WITH RATE 1/8
PRIMARY AND
SIGNALING
TRAFFIC

7200 BPS
SIGNALING
TRAFFIC ONLY

3600 BPS
PRIMARY TRAFFIC
ONLY

3600 BPS
DIM AND BURST
WITH RATE 1/8
PRIMARY AND
SIGNALING
TRAFFIC

3600 BPS
SIGNALING
TRAFFIC ONLY

1800 BPS PRIMARY TRAFFIC ONLY

14400 BPS DIM AND BURST WITH RATE 1/2 PRIMARY AND SECONDARY TRAFFIC

14400 BPS DIM AND BURST WITH RATE 1/4 PRIMARY AND SECONDARY TRAFFIC

14400 BPS DIM AND BURST WITH RATE 1/8 PRIMARY AND SECONDARY TRAFFIC

14400 BPS BLANK AND BURST WITH SECONDARY TRAFFIC ONLY

14400 BPS DIM AND BURST WITH RATE 1/8 PRIMARY, SECONDARY, AND SIGNALING TRAFFIC

7200 BPS DIM AND BURST WITH RATE 1/4 PRIMARY AND SECONDARY TRAFFIC

7200 BPS DIM AND BURST WITH RATE 1/8 PRIMARY AND SECONDARY TRAFFIC

7200 BPS BLANK AND BURST WITH SECONDARY TRAFFIC ONLY

7200 BPS DIM AND BURST WITH RATE 1/8 PRIMARY, SECONDARY, AND SIGNALING TRAFFIC

3600 BPS DIM AND BURST WITH RATE 1/8 PRIMARY AND SECONDARY TRAFFIC ONLY

3600 BPS BLANK AND BURST WITH SECONDARY TRAFFIC ONLY

1800 BPS
BLANK AND
BURST WITH
SECONDARY
TRAFFIC ONLY

NOTATION
- E  ERASURE INDICATOR BIT
- R  RESERVED BIT
- MM  MIXED MODE BIT
- FM  FRAME MODE BITS
- F  FRAME QUALITY INDICATOR (CRC) BITS
- T  ENCODER TAIL BITS 5,568,483

METHOD AND APPARATUS FOR THE FORMATTING OF DATA FOR TRANSMISSION

BACKGROUND OF THE INVENTION

I. Field of the Invention

The present application is a continuation-in-part application of U.S. patent application Ser. No. 08/171,146, filed Dec. 21, 1993, entitled "METHOD AND APPARATUS FOR FORMATTING DATA FOR TRANSMISSION", now U.S. Pat. No. 5,504,773, which is a continuation of U.S. patent application Ser. No. 07/822,164, filed Jan. 16, 1992, now abandoned, which is a continuation-in-part of U.S. patent application Ser. No. 07/543,496, filed Jun. 25, 1990, entitled "SYSTEM AND METHOD FOR GENERATING SIGNAL WAVEFORMS IN A CDMA CELLULAR TELEPHONE SYSTEM", now U.S. Pat. No. 5,103,459, and as such relates to the organization of data for transmission. More particularly, the present invention relates to a novel and improved method and apparatus for formatting vocoder data, non-vocoder data and signaling data for transmission.

II. Description of the Related Art

In the field of digital communications various arrangements of digital data for transmission are used. The data bits are organized according to commonly used formats for transfer over the communication medium.

It is therefore an object of the present invention to provide a data format which facilitates the communication of various types of data, and data of various rates, to be communicated in a structured form.

SUMMARY OF THE INVENTION

The present invention is a novel and improved method and system for formatting digital data for communication over a transmission medium.

In communication systems it is important to utilize a data format which permits a full communication of data between users. In a communication system, such as a code division multiple access (CDMA) communication system, in which it is desirable to communicate various types of data, and at various rates, a data format must be selected which permits maximum flexibility within a predefined structure. Furthermore to maximize resources it is desirable to permit a sharing of the format to permit different types of data to be organized together. In such situations it is necessary to structure the data in a manner in which it may be readily extracted according to the corresponding type and rate.

In accordance with the present invention a method and apparatus is provided for arranging various types of data, and at various rates into a uniquely structured format for transmission. Data is provided as vocoder data or different types of non-vocoder data. The data is organized into frames of a predetermined time duration for transmission. The data frames are organized, depending on the data, to be at one of several data rates. Vocoder data is provided at one of several data rates and is organized in the frame according to a predetermined format. Frames may be formatted with a sharing of vocoder data with non-vocoder data to be at a highest frame data rate. Non-vocoder data may be organized so as to also be at a highest frame rate. Additional control data may be provided within the data frames to support various aspects of the transmission and recovery upon reception.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 5a–5d illustrate in a series of charts the ordering of code symbols in the interleaver array for transmission data rates of 9.6, 4.8, 2.4 and 1.2 kbps, respectively;

FIGS. 6a–6c is a chart illustrating the Walsh symbol corresponding to each encoder symbol group;

DETAILED DESCRIPTION OF THE PREFERRED EMBODIMENTS

Figure 1:
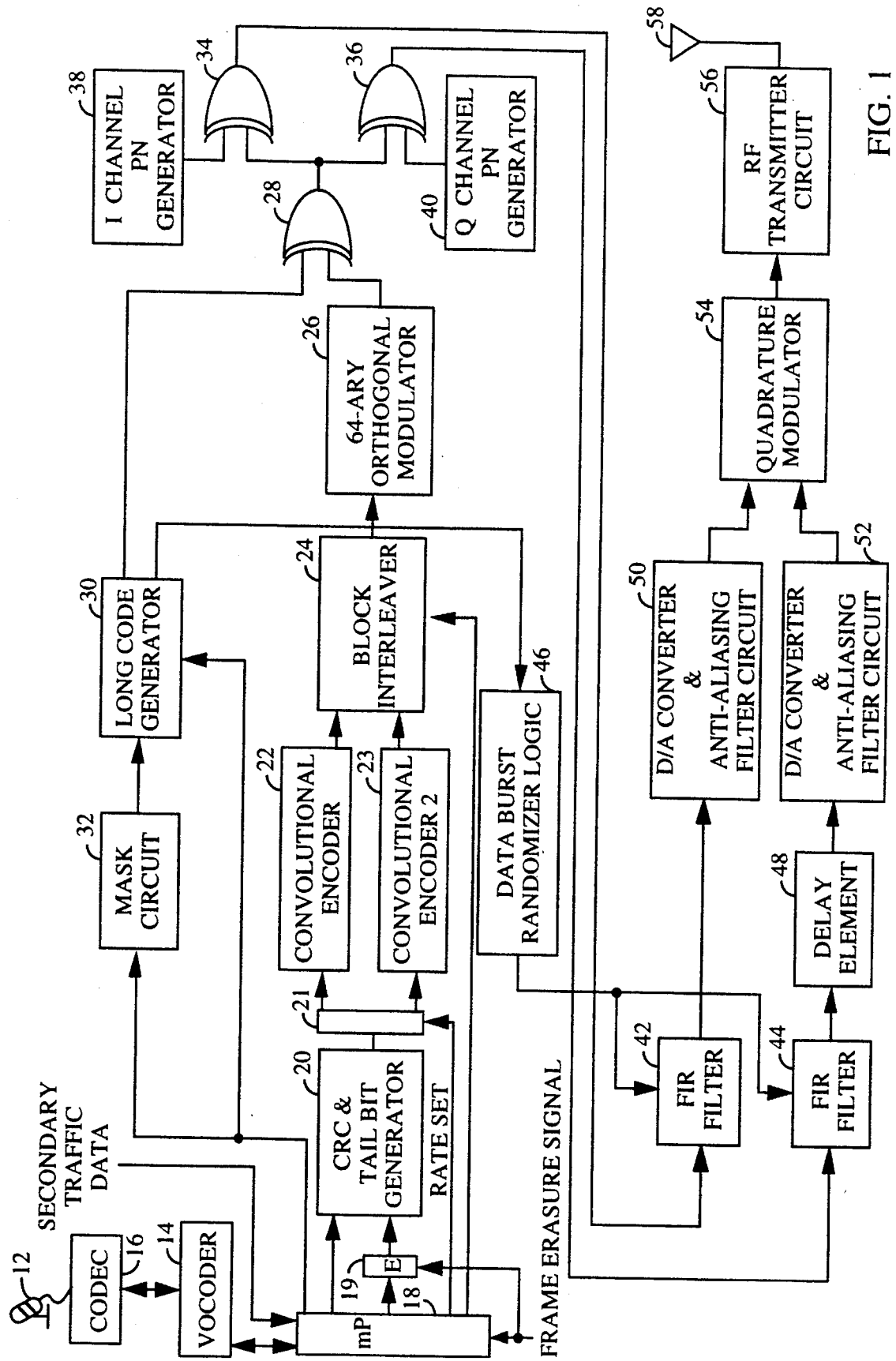
FIG. 1 is a block diagram illustrating an exemplary embodiment for a transmitter portion of a transceiver.

Referring now to the drawings, FIG. 1 illustrates an exemplary embodiment of a transmit portion 10 of a CDMA mobile station transceiver or PCN handset. In a CDMA cellular communication system a forward CDMA channel is used to transmit information from a cell base station to the mobile station. Conversely a reverse CDMA channel is used to transmit information from the mobile station to the cell base station. The communication of signals from the mobile station may be characterized in the form of an access channel or a traffic channel communication. The access channel is used for short signaling messages such as call originations, responses to pages, and registrations. The traffic channel is used to communicate (1) primary traffic, typically includes user speech, or (2) secondary traffic, typically user data, or (3) signaling traffic, such as command and control signals, or (4) a combination of primary traffic and secondary traffic or (5) a combination of primary traffic and signaling traffic.

Transmit portion 10 enables data to be transmitted on the reverse CDMA channel at data rates of 9.6 kbps, 4.8 kbps, 2.4 kbps or 1.2 kbps. Transmissions on the reverse traffic channel may be at any of these data rates while transmissions on the access channel are at the 4.8 kbps data rate. The transmission duty cycle on the reverse traffic channel will vary with the transmission data rate. Specifically, the transmission duty cycle for each rate is provided in Table I. As the duty cycle for transmission varies proportionately with the data rate, the actual burst transmission rate is fixed at 28,800 code symbols per second. Since six code symbols are modulated as one of 64 Walsh symbols for transmission, the Walsh symbol transmission rate shall be fixed at 4800 Walsh symbols per second which results in a fixed Walsh chip rate of 307.2 kcps.

All data that is transmitted on the reverse CDMA channel is convolutional encoded, block interleaved, modulated by 64-ary modulation, and direct-sequence PN spread prior to transmission. Table I further defines the relationships and rates for data and symbols for the various transmission rates on the reverse traffic channel. The numerology is identical for the access channel except that the transmission rate is fixed at 4.8 kbps, and the duty cycle is 100%. As described later herein each bit transmitted on the reverse CDMA channel is convolutional encoded using a rate ⅓ code. Therefore, the code symbol rate is always three times the data rate. The rate of the direct-sequence spreading functions shall be fixed at 1.2288 MHz, so that each Walsh chip is spread by precisely four PN chips.

TABLE I

| Bit Rate (kbps) | 9.6 | 4.8 | 2.4 | 1.2 |
|---|---|---|---|---|
| PN Chip Rate (Mcps) | 1.2288 | 1.2288 | 1.2288 | 1.2288 |
| Code Rate (bits/code symbol) | 1/3 | 1/3 | 1/3 | 1/3 |
| TX Duty Cycle (%) | 100.0 | 50.0 | 25.0 | 12.5 |
| Code Symbol Rate (sps) | 28,800 | 28,800 | 28,800 | 28,800 |
| Modulation (code symbol/ Walsh symbol) | 6 | 6 | 6 | 6 |
| Walsh Symbol Rate (sps) | 4800 | 4800 | 4800 | 4800 |
| Walsh Chip; Rate (kcps) | 307.20 | 307.20 | 307.20 | 307.20 |
| Walsh Symbol (μs) | 208.33 | 208.33 | 208.33 | 208.33 |
| PN Chips/ Code Symbol | 42.67 | 42.67 | 42.67 | 42.67 |
| PN Chips/ Walsh Symbol | 256 | 256 | 256 | 256 |
| PN Chips/ Walsh Chip | 4 | 4 | 4 | 4 |

Transmit portion 10, when functioning in mode in which primary traffic is present, communicates acoustical signals, such as speech and/or background noise, as digital signals over the transmission medium. To facilitate the digital communication of acoustical signals, these signals are sampled and digitized by well known techniques. For example, in FIG. 1, sound is converted by microphone 12 to an analog signal which is then converted to a digital signal by codec 14. Codec 14 typically performs an analog to digital conversion process using a standard 8 bit/μlaw format. In the alternative, the analog signal may be directly converted to digital form in a uniform pulse code modulation (PCM) format. In an exemplary embodiment codec 14 uses an 8 kHz sampling and provides an output of 8 bit samples at the sampling rate so as to realize a 64 kbps data rate.

The 8-bit samples are output from codec 14 to vocoder 16 where a μlaw/uniform code conversion process is performed. In vocoder 16, the samples are organized into frames of input data wherein each frame is comprised of a predetermined number of samples. In a preferred implementation of vocoder 16 each frame is comprised of 160 samples or of 20 msec. of speech at the 8 kHz sampling rate. It should be understood that other sampling rates and frame sizes may be used. Each frame of speech samples is variable rate encoded by vocoder 16 with the resultant parameter data formatted into a corresponding data packet. The vocoder data packets are then output to microprocessor 18 and associated circuitry for transmission formatting. Microprocessor 18 generically includes program instructions contained with a program instruction memory, a data memory, and appropriate interface and related circuitry as is known in the art.

A preferred implementation of vocoder 16 utilizes a form of the Code Excited Linear Predictive (CELP) coding techniques so as to provide a variable rate in coded speech data. A Linear Predictive Coder (LPC) analysis is performed upon a constant number of samples, and the pitch and codebook searches are performed on varying numbers of samples depending upon the transmission rate. A variable rate vocoder of this type is described in further detail in copending U.S. patent application Ser. No. 08/004,484, filed Jan. 14, 1993, which is a continuation of U.S. patent application Ser. No. 07/713,661 filed Jun. 11, 1991, now abandoned, and assigned to the Assignee of the present invention and of which the disclosure is incorporated by reference. Vocoder 16 may be implemented in an application specific integrated circuit (ASIC) or in a digital signal processor.

In the variable rate vocoder just mentioned, the speech analysis frames are 20 msec. in length, implying that the extracted parameters are output to microprocessor 18 in a burst 50 times per second. Furthermore the rate of data output is varied from roughly 8 kbps to 4 kbps to 2 kbps, and to 1 kbps.

At full rate, also referred to as rate 1, data transmission between the vocoder and the microprocessor is at an 8.55 kbps rate. For the full rate data the parameters are encoded for each frame and represented by 160 bits. The full rate data frame also includes a parity check of 11 bits thus resulting in a full rate frame being comprised of a total of 171 bits. In the full rate data frame, the transmission rate between the vocoder and the microprocessor absent the parity check bits would be 8 kbps.

At half rate, also referred to as rate ½, data transmission between the vocoder and the microprocessor is at a 4 kbps rate with the parameters encoded for each frame using 80 bits. At quarter rate, also referred to as rate ¼, data transmission between the vocoder and the microprocessor is at a 2 kbps rate with the parameters encoded for each frame using 40 bits. At eighth rate, also referred to as rate ⅛, data transmission between the vocoder and the microprocessor is slightly less than a 1 kbps rate with the parameters encoded for each frame using 16 bits.

In addition, no information may be sent in a frame between the vocoder and the microprocessor. This frame type, referred to as a blank frame, may be used for signaling or other non-vocoder data.

The vocoder data packets are then output to microprocessor 18 and CRC and Tail Bit generator 20 for completing the transmission formatting. Microprocessor 18 receives packets of parameter data every 20 msec. along with a rate indication for the rate the frame of speech samples was encoded. Microprocessor 18 also receives, if present, an input of secondary traffic data for output to generator 20. Microprocessor 18 also internally generates signaling data for output to generator 20. Data, whether it is primary traffic, secondary traffic or signaling traffic matter, if present, is output from microprocessor 18 to generator 20 every 20 msec. frame.

Generator 20 generates and appends at the end of all full and half rate frames a set of parity check bits, frame quality indicator bits or cyclic redundancy check (CRC) bits which are used at the receiver as a frame quality indicator. For a full rate frame, regardless of whether the data is a full rate primary, secondary or signaling-traffic, or a combination of half rate primary and secondary traffic, or a combination of half rate primary and signaling traffic, generator 20 preferably generates a set of frame quality indicator bits according to a first polynomial. For a half rate data frame, generator 20 also generates a set of frame quality indicator bits preferably according to a second polynomial. Generator 20 further generates for all frame rates a set of encoder tail bits which follow the frame quality indicator bits, if present, or data if frame quality indicator bits are not present, at the end of the frame. Further details of the operation on microprocessor 18 and generator 20 are provided later herein with reference to FIGS. 3 and 4.

Reverse traffic channel frames provided from generator 20 at the 9.6 kbps rate are 192 bits in length and span the 20 msec. frame. These frames consist of a single mixed mode bit, auxiliary format bits if present, message bits, a 12-bit frame quality indicator, and 8 tail bits as shown in FIGS. 2a–2e and 2i–2l. The mixed mode bit shall be set to '0' during any frame in which the message bits are primary traffic information only. When the mixed mode bit is '0', the frame shall consist of the mixed mode bit, 171 primary traffic bits, 12 frame quality indicator bits, and 8 tail bits.

The mixed mode bit is set to '1' for frames containing secondary or signaling traffic. If the the mixed mode bit is set to '1' the frame is of a "blank-and-burst" or a "dim-and-burst" format. A "blank-and-burst" operation is one in which the entire frame is used for secondary or signaling traffic while a "dim-and-burst" operation is one in which the primary traffic shares the frame with either secondary or signaling traffic.

The first bit following the mixed mode bit is a traffic type bit. The traffic type bit is used to specify whether the frame contains secondary or signaling traffic. If the traffic type bit is a '0', the frame contains signaling traffic, and if a '1', the frame contains secondary traffic. FIGS. 2b–2e and 2i–2l illustrate the traffic type bit. The two bits following the traffic type bit are traffic mode bits. The two traffic mode bits specify the combination of data within the frame.

In the preferred implementation only primary traffic is transmitted in frames at the 4.8 kbps, 2.4 kbps, and 1.2 kbps rates. Mixed mode operation is generally not to be supported at rates other than the 9.6 kbps rate, although it may be readily configured to do so. The frame formats for these particular rates are shown in FIGS. 2f–2h. For the 4.8 kbps rate, the frame is 96 bits in length with the bits spaced over the 20 msec. time period of the frame as described later herein. The 4.8 kbps rate frame contains 80 primary traffic bits, an 8 frame quality indicator bits, and 8 tail bits. For the 2.4 kbps rate, the frame is 48 bits in length with the bits spaced over the 20 msec. time period of the frame as also described later herein. The 2.4 kbps rate frame contains 40 primary traffic bits and 8 tail bits. For the 1.2 kbps rate, the frame is 24 bits in length with the bits spaced over the 20 msec. time period of the frame as also described later herein. The 1.2 kbps rate frame contains 16 primary traffic bits and 8 tail bits.

In a preferred embodiment the access channel data is generated by microprocessor 18 for transmission at a rate of 4.8 kbps. As such the data is prepared in a manner identical to that of 4.8 kbps frame format data, such as encoding, interleaving as Walsh encoding. In the encoding scheme implemented for the 4.8 kbps data, whether reverse traffic channel data or access channel data, redundant data is generated. Unlike the reverse traffic channel where the redundant data is eliminated in the transmission, in access channel all data including redundant data is transmitted. Details on the transmission aspects of frames of access channel data are provided later herein.

Figure 2A:
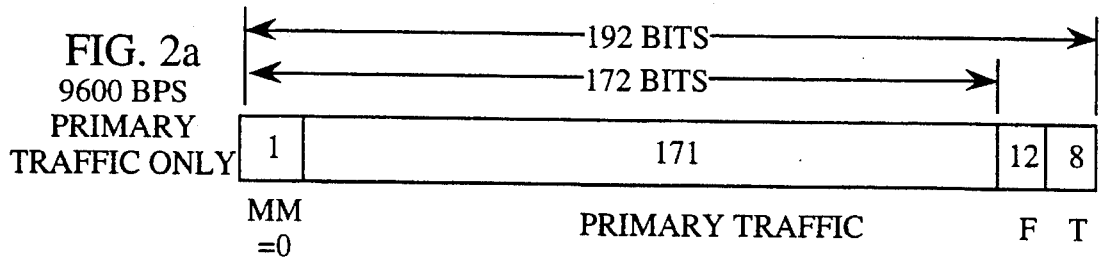
FIGS. 2a–2l are a series of diagrams illustrating frame data formats for the various data rates, types and modes of rate set 1.
Figure 2B:
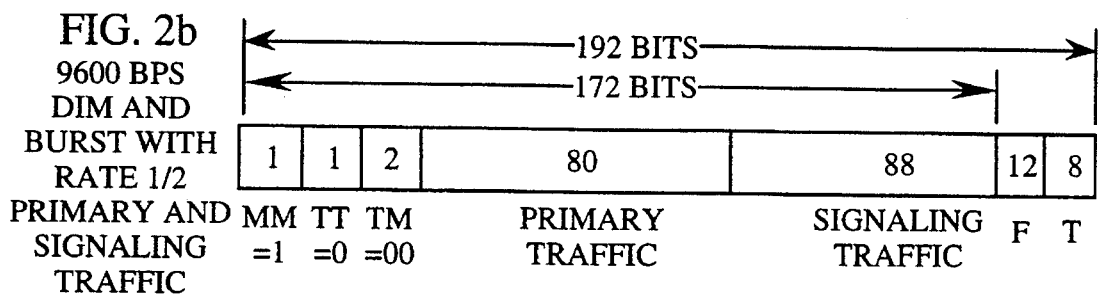
Figure 2C:
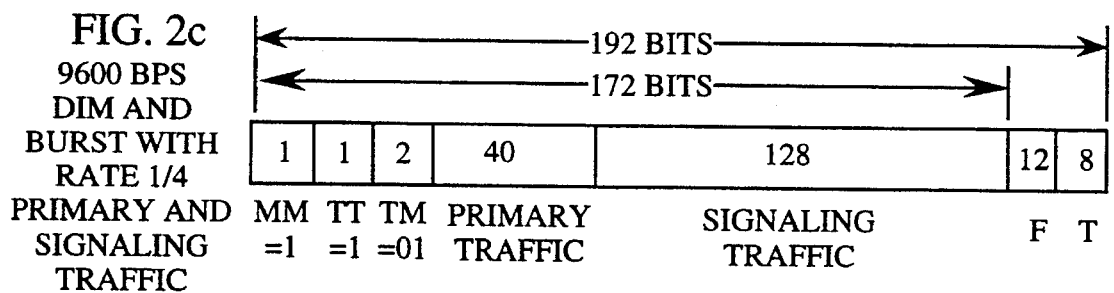
Figure 2D:
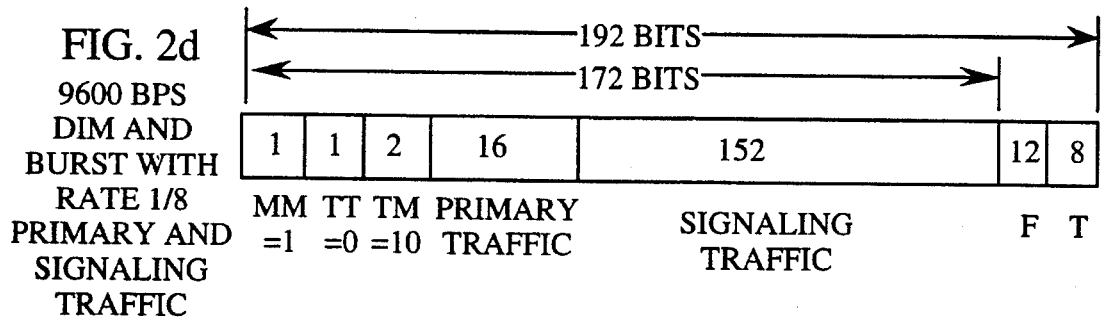
Figure 2E:
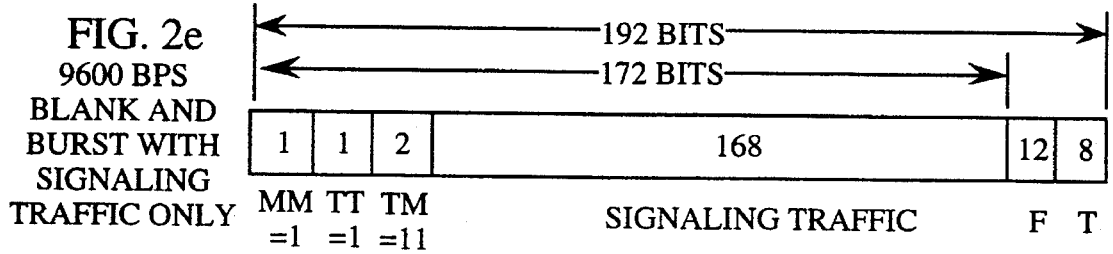
Figure 2F:
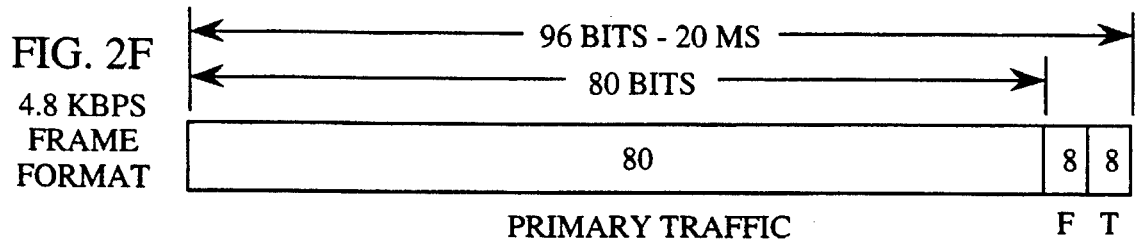
Figure 2G:
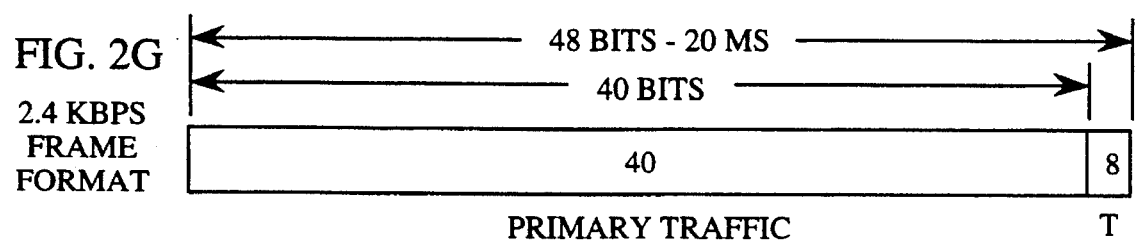
Figure 2H:
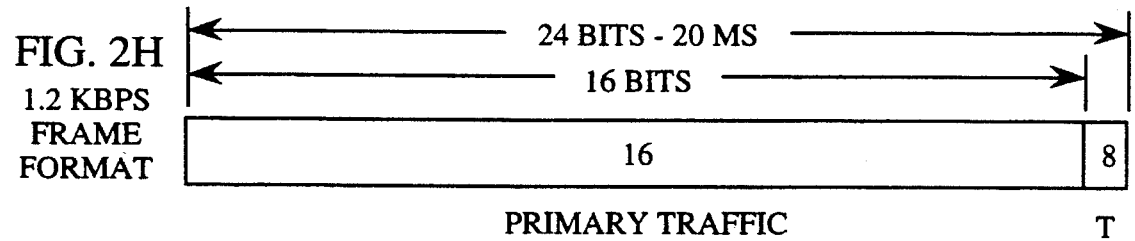

FIGS. 2a–2l illustrate the frame formats of frames output by generator 20 for frames of rates 9.6 kbps, 4.8 kbps, 2.4 kbps and 1.2 kbps. FIG. 2a illustrates a 9.6 kbps frame for the transmission of primary traffic only. The frame consists of one mixed mode bit, which is set to 0 to indicate that the frame contains only primary traffic data, 171 bits of primary traffic data, 12 frame quality indicator bits and 8 tail bits.

FIG. 2b illustrate a 9.6 kbps dim and burst frame for the transmission of rate ½ primary traffic and signaling traffic. The frame consists of one mixed mode bit, which is set to 1 to indicate the frame does not contain primary traffic only, one traffic type bit set to zero to indicate signaling data is in the frame, two traffic mode bits set to 00 to indicate that the frame contains rate ½ primary traffic and signaling traffic, 80 primary traffic bits, 88 signaling-traffic bits, 12 frame quality indicator bits and 8 tail bits.

FIG. 2c illustrate a 9.6 kbps dim and burst frame for the transmission of rate ¼ primary traffic and signaling traffic. The frame consists of one mixed mode bit, which is set to 1 to indicate the frame does not contain primary traffic only, one traffic type bit set to zero to indicate signaling data is in the frame, two traffic mode bits set to 01 to indicate that the frame contains rate ¼ primary traffic and signaling traffic, 40 primary traffic bits, 128 signaling traffic bits, 12 frame quality indicator bits and 8 tail bits.

FIG. 2d illustrate a 9.6 kbps dim and burst frame for the transmission of rate ⅛ primary traffic and signaling traffic. The frame consists of one mixed mode bit, which is set to 1 to indicate the frame does not contain primary traffic only, one traffic type bit set to zero to indicate signaling data is in the frame, two traffic mode bits set to 10 to indicate that the frame contains rate ⅛ primary traffic and signaling traffic, 16 primary traffic bits, 152 signaling traffic bits, 12 frame quality indicator bits and 8 tail bits.

FIG. 2e illustrate a 9.6 kbps blank and burst frame for the transmission of signaling traffic. The frame consists of one mixed mode bit, which is set to 1 to indicate the frame does not contain primary traffic only, one traffic type bit set to zero to indicate signaling data is in the frame, two traffic mode bits set to 11 to indicate that the frame contains signaling traffic only, 168 signaling traffic bits, 12 frame quality indicator bits and 8 tail bits.

FIG. 2f illustrates a 4.8 kbps frame for the transmission of rate ½ primary traffic only. The frame contains 80 primary traffic bits, 8 frame quality indicator bits and 8 tail bits. FIG. 2g illustrates a 2.4 kbps frame for the transmission of rate ¼ primary traffic only. The frame contains 40 primary traffic bits and 8 tail bits. FIG. 2h illustrates a 1.2 kbps frame for the transmission of rate ⅛ primary traffic only. The frame contains 16 primary traffic bits and 8 tail bits.

Figure 2I:
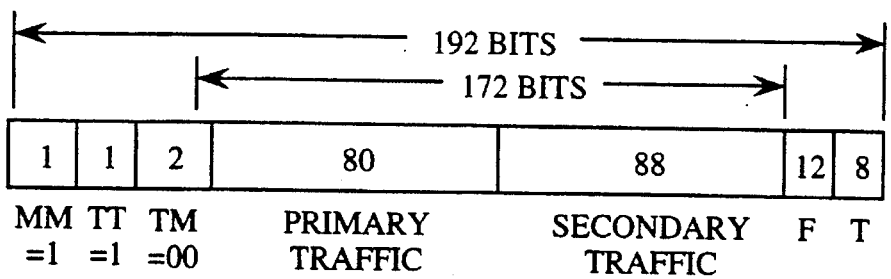

FIG. 2i illustrate a 9.6 kbps dim and burst frame for the transmission of rate ½ primary traffic and secondary traffic. The frame consists of one mixed mode bit, which is set to 1 to indicate the frame does not contain primary traffic only, one traffic type bit set to 1 to indicate secondary data is in the frame, two traffic mode bits set to 00 to indicate that the frame contains rate ½ primary traffic and secondary traffic, 80 primary traffic bits, 88 secondary traffic bits, 12 frame quality indicator bits and 8 tail bits.

Figure 2J:
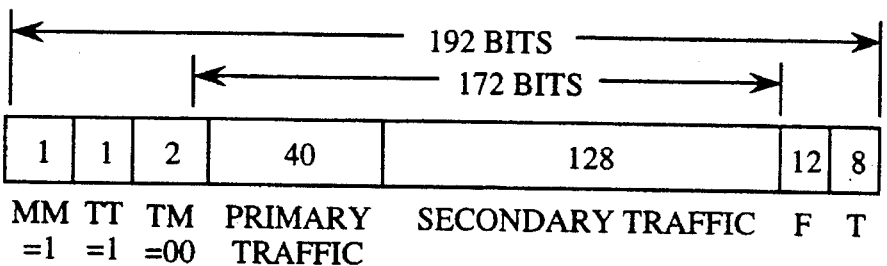

FIG. 2j illustrate a 9.6 kbps dim and burst frame for the transmission of rate ¼ primary traffic and secondary traffic.

The frame consists of one mixed mode bit, which is set to 1 to indicate the frame does not contain primary traffic only, one traffic type bit set to 1 to indicate secondary data is in the frame, two traffic mode bits set to 01 to indicate that the frame contains rate ¼ primary traffic and secondary traffic, 40 primary traffic bits, 128 secondary traffic bits, 12 frame quality indicator bits and 8 tail bits.

Figure 2K:
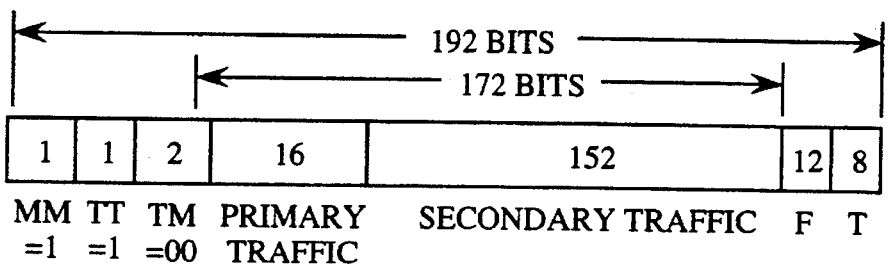

FIG. 2k illustrate a 9.6 kbps dim and burst frame for the transmission of rate ⅛ primary traffic and secondary traffic. The frame consists of one mixed mode bit, which is set to 1 to indicate the frame does not contain primary traffic only, one traffic type bit set to 1 to indicate secondary data is in the frame, two traffic mode bits set to 10 to indicate that the frame contains rate ⅛ primary traffic and secondary traffic, 16 primary traffic bits, 152 secondary traffic bits, 12 frame quality indicator bits and 8 tail bits.

Figure 2L:
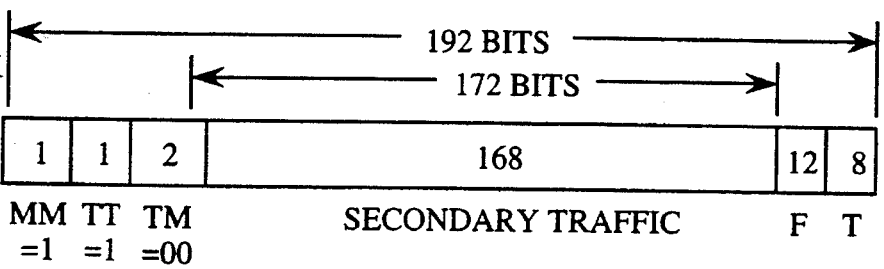

FIG. 2l illustrate a 9.6 kbps blank and burst frame for the transmission of secondary traffic. The frame consists of one mixed mode bit, which is set to 1 to indicate the frame does not contain primary traffic only, one traffic type bit set to 1 to indicate secondary data is in the frame, two traffic mode bits set to 11 to indicate that the frame contains secondary traffic only, 168 secondary traffic bits, 12 frame quality indicator bits and 8 tail bits.

Figure 3:
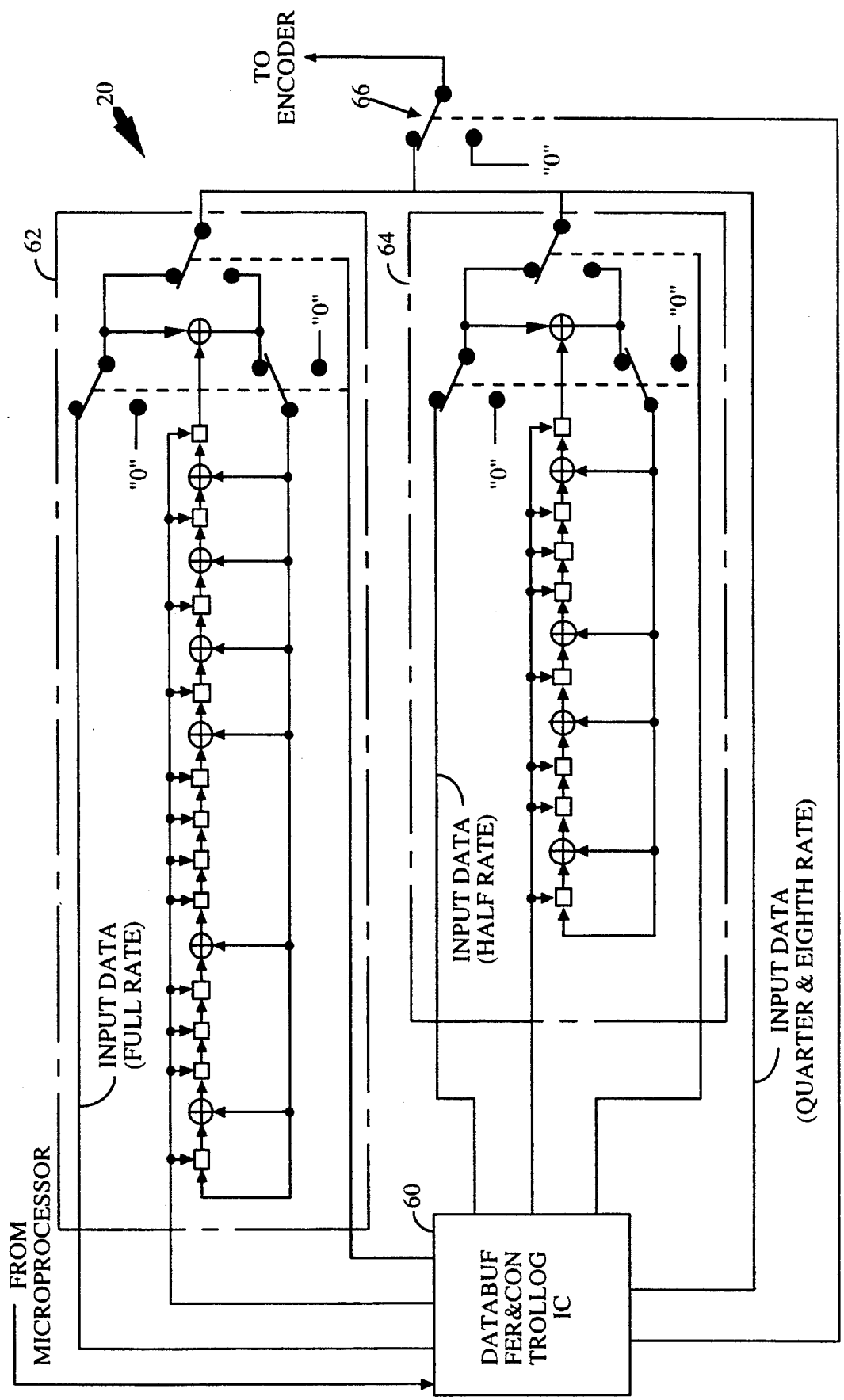
FIG. 3 is a diagram illustrating an exemplary circuit implementation of the CRC and Tail Bit generator of FIG. 1.

FIG. 3 illustrates an exemplary implementation of the elements for formatting the data in accordance with FIGS. 2a–2l. In FIG. 3 data is transmitted from microprocessor 18 (FIG. 1) to generator 20. Generator 20 is comprised of data buffer and control logic 60, CRC circuits 62 and 64, and tail bit circuit 66. Along with data provided from the microprocessor a rate command may optionally be provided. Data is transferred for each 20 msec frame from the microprocessor to logic 60 where temporarily stored. For each frame, logic 60 may for each frame count the number of bits transmitted from the microprocessor, or in the alternative use the rate command and a count of the clock cycles in formatting a frame of data.

Each frame of the traffic channel includes a frame quality indicator. For the 9.6 kbps and 4.8 kbps transmission rates, the frame quality indicator is the CRC. For the 2.4 kbps and 1.2 kbps transmission rates, the frame quality indicator is implied, in that no extra frame quality bits are transmitted. The frame quality indicator supports two functions at the receiver. The first function is to determine the transmission rate of the frame, while the second function is to determine whether the frame is in error. At the receiver these determinations are made by a combination of the decoder information and the CRC checks.

For the 9.6 kbps and 4.8 kbps rates, the frame quality indicator (CRC) is calculated on all bits within the frame, except the frame quality indicator (CRC) itself and the tail bits. Logic 60 provides the 9.6 kbps and 4.8 kbps rate data respectively to CRC circuits 62 and 64. Circuits 62 and 64 are typically constructed as a sequence of shift registers, modulo-2 adders (typically exclusive-OR gates) and switches as illustrated.

The 9.6 kbps transmission rate data uses a 12-bit frame quality indicator (CRC), which is be transmitted within the 192-bit long frame as discussed with reference to FIGS. 2a–2e and 2i–2l. As illustrated in FIG. 3 for CRC circuit 62, the generator polynomial for the 9.6 kbps rate is as follows:

$$g(x)=x^{12}+x^{11}+x^{10}+x^9+x^8+x^4+x+1. \quad (1)$$

The 4.8 kbps transmission rate data uses an 8-bit CRC, which is transmitted within the 96-bit long frame. As illustrated in FIG. 3 for CRC circuit 64, the generator polynomial for the 4.8 kbps rate is as follows:

$$g(x)=x^8+x^7+x^4+x^3+x+1. \quad (2)$$

Initially, all shift register elements of circuits 62 and 64 are set to logical one ('1') by an initialization signal from logic 60. Furthermore logic 60 set the switches of circuits 62 and 64 in the up position.

For 9.6 kbps rate data, the registers of circuit 62 are then clocked 172 times for the 172 bits in the sequence of primary traffic, secondary traffic or signaling bits or a mixture thereof along with the corresponding mode/format indicator bits as input to circuit 62. After 172 bits are clocked through circuit 62, logic 60 then sets the switches of circuit 62 in the down position with the registers of circuit 62 then being clocked an additional 12 times. As a result of the 12 additional clockings of circuit 62, 12 additional output bits are generated which are the frame quality indicator bits (CRC bits). The frame quality indicator bits, in the order calculated, are appended to the end of the 172 bits as output from circuit 62. It should be noted that the 172 bits output from logic 60 which pass through circuit 62 are undisturbed by the computation of the CRC bits and are thus output from circuit 62 in the same order and at the same value at which they entered.

For 9.6 kbps rate data bits are input to circuit 64 from logic 60 in the following order. For the case of primary traffic only, the bits are input to circuit 64 from logic 60 in the order of the single mixed mode (MM) bit followed by the 171 primary traffic bits. For the case of "dim and burst" with primary and signaling traffic, the bits are input to circuit 64 from logic 60 in the order of the single MM bit, a traffic type (TT) bit, a pair of traffic mode (TM) bits, 80 primary traffic bits, and 86 signaling traffic bits. For the case of "dim and burst" with primary and secondary traffic, the bits are input to circuit 64 from logic 60 in the order of the single MM bit, the TT bit, the pair of TM bits, 80 primary traffic bits and 87 signaling traffic bits. For the case of "blank and burst" data format with signaling traffic only, the bits are input to circuit 64 from logic 60 in the order of the single MM bit, the TT bit and 168 signaling traffic bits. For the case of "blank and burst" data format with secondary traffic only, the bits are input to circuit 64 from logic 60 in the order of the single MM bit, the TT bit and 169 signaling traffic bits.

Similarly for 4.8 kbps rate data, the registers of circuit 64 are clocked 80 times for the 80 bits of primary traffic data, or for the 80 bits of access channel data, as input to circuit 64 from logic 60. After the 80 bits are clocked through circuit 64, logic 60 then sets the switches of circuit 64 in the down position with the registers of circuit 64 then being clocked an additional 8 times. As a result of the 12 additional clockings of circuit 62, 12 additional output bits are generated which are the CRC bits. The CRC bits, in the order calculated, are again appended to the end of the 80 bits as output from circuit 64. It should again be noted that the 80 bits output from logic 60 which pass through circuit 64 are undisturbed by the computation of the CRC bits and are thus output from circuit 64 in the same order and at the same value at which they entered.

The bits output from either of circuits 62 and 64 are provided to switch 66 which is under the control of logic 60. Also input to switch 66 are the 40 and 16 bits of primary traffic data output from logic 60 for 2.4 kbps and 1.2 kbps data frames. Switch 66 selects between providing an output of the input data (up position) and tail bits at a logical zero ('0') value (down position). Switch 66 is normally set in the up position to permit data from logic 60, and from circuits 62 and 64 if present, to be output from generator 20 to encoder 22 (FIG. 1). For the 9.6 kbps and 4.8 kbps frame data, after the CRC bits are clocked through switch 66, logic 60 sets the switch to the down position for 8 clock cycles so as to generate 8 all zero tail bits. Thus for 9.6 kbps and 4.8 kbps data frames, the data as output to the encoder for the frame includes appended after the CRC bits, the 8 tail bits. Similarly for the 2.4 kbps and 1.2 kbps frame data, after the primary traffic bits are clocked from logic 60 through switch 66, logic 60 sets the switch to the down position for 8 clock cycles so as to again generate 8 all zero tail bits. Thus for 2.4 kbps and 1.2 kbps data frames, the data as output to the encoder for the frame includes appended after the primary traffic bits, the 8 tail bits.

Figure 4A:
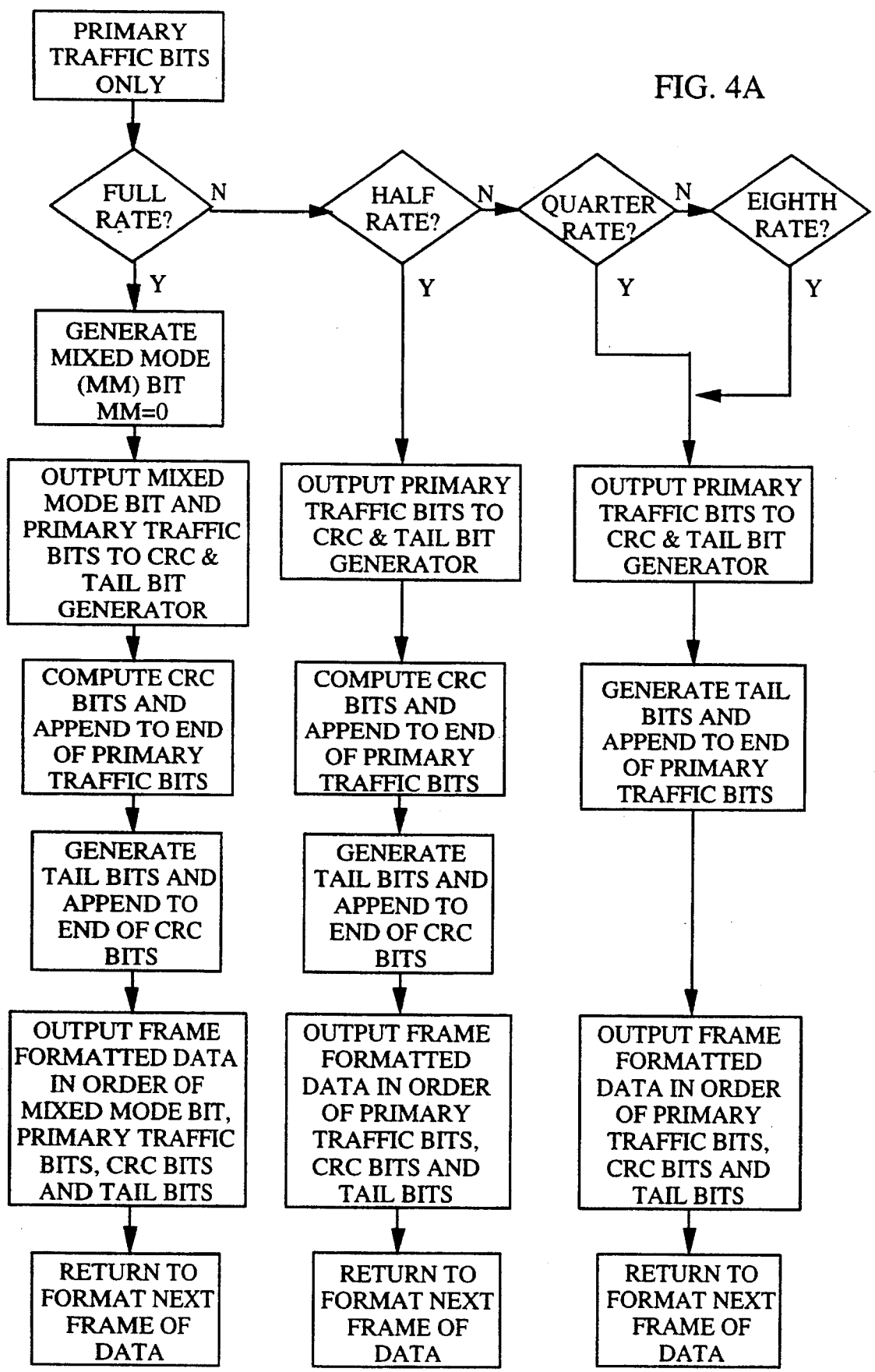
FIGS. 4a–4c is a flow chart of the formatting of flames of data.
Figure 4B:
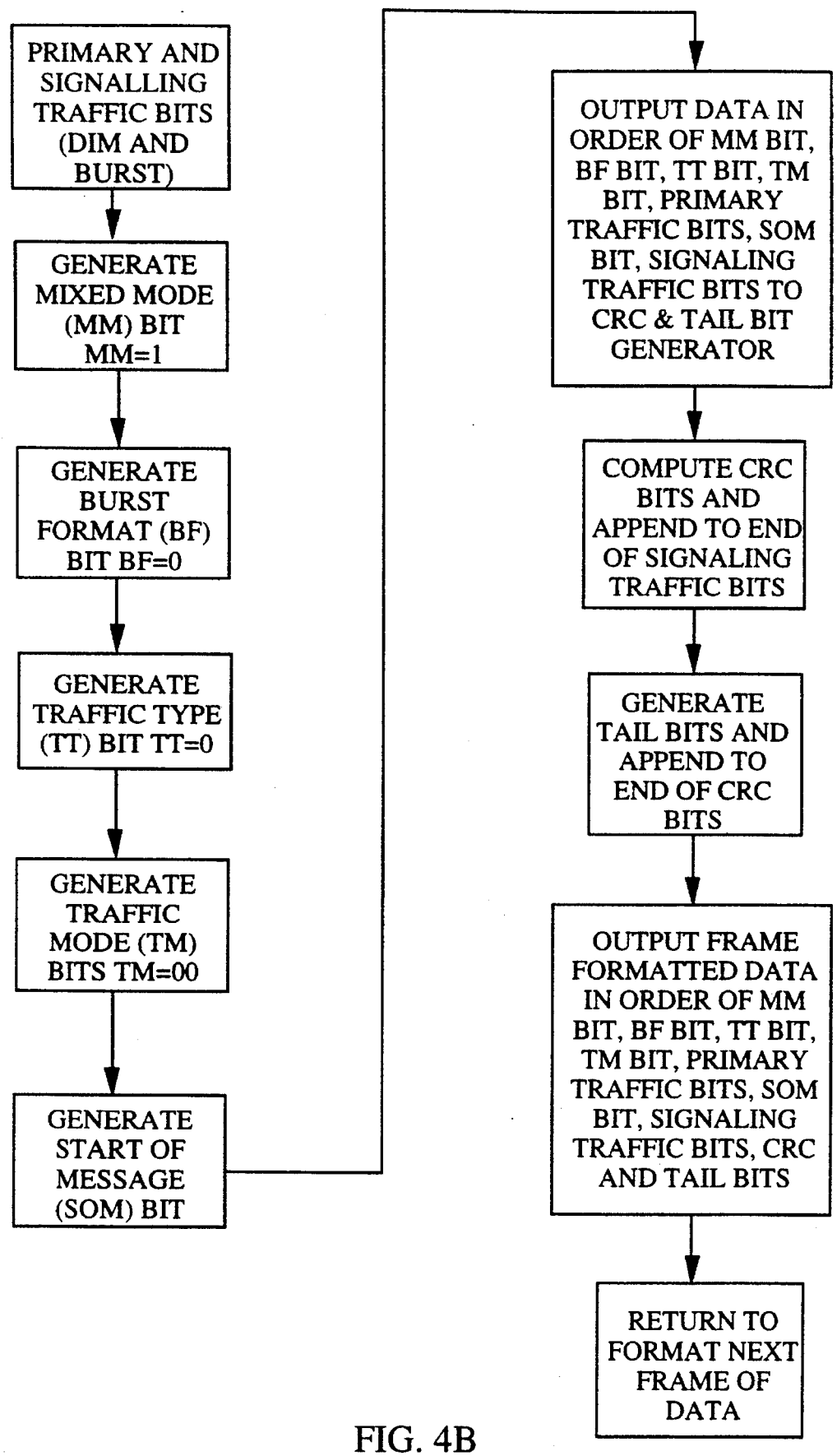
Figure 4C:
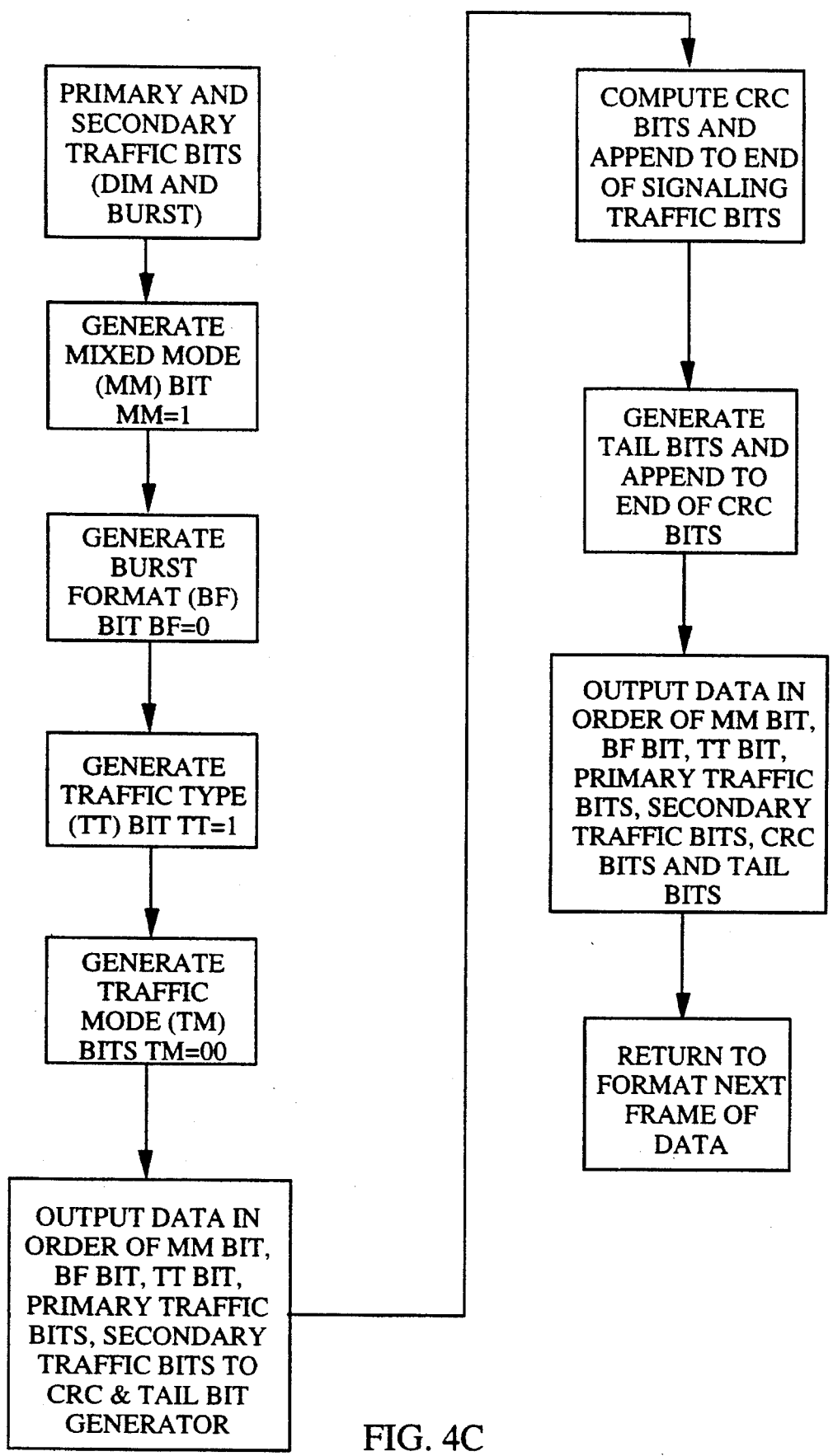

FIGS. 4a–4c illustrate in a series of flow charts the operation of microprocessor 18, and generator 20 in assembling the data into the disclosed frame format. It should be noted that various schemes may be implemented for giving the various traffic types and rates priority for transmission. In an exemplary implementation, when a signaling traffic message is to be sent when there is vocoder data present a "dim and burst" format may be selected. Microprocessor 18 may generate a command to vocoder 18 for the vocoder to encode speech sample frames at the half rate, regardless of the rate at which the vocoder would normally encode the sample frame. Microprocessor 18 then assembles the half rate vocoder data with the signaling traffic into the 9.6 kbps frame. In this case, a limit may be place on the number of speech frames encoded at the half rate to avoid degradation in the speech quality. In the alternative, microprocessor 18 may wait until a half rate frame of vocoder data is received before assembling the data into the "dim and burst" format. In this case, in order to ensure timely transmission of the signaling data, a maximum limit on the number of consecutive frames at other than half rate may be imposed before a command is sent to the vocoder to encode at half rate. Secondary traffic may be transferred in the "dim and burst" format (FIG. 2b–2d and FIGS. 2i–2k) in a similar manner.

Similar is the case for the "blank and burst" data formats as illustrated in FIGS. 2e and 2l. The vocoder may be commanded to not encode the frame of speech samples or the vocoder data is ignored by the microprocessor in constructing the data frame. Prioritizing between generating frame formats of primary traffic of various rate, "dim and burst" traffic, and "blank and burst" traffic is open to many possibilities.

Referring back to FIG. 1, 20 msec. frames of 9.6 kbps, 4.8 kbps, 2.4 kbps and 1.2 kbps data are thus output from generator 20 to encoder 22. In the exemplary embodiment encoder 22 is a preferably a convolutional encoder, a type of encoder well known in the art. Encoder 22 preferably encodes the data using a rate ⅓, constraint length k=9 convolutional code. As an example encoder 22 is constructed with generator functions of $g_0$=557 (octal), $g_1$=663 (octal) and $g_2$=711 (octal). As is well known in the art, convolutional encoding involves the modulo-2 addition of selected taps of a serially time-shifted delayed data sequence. The length of the data sequence delay is equal to k−1, where k is the code constraint length. Since in the preferred embodiment a rate ⅓ code is used, three code symbols, the code symbols ($c_0$), ($c_1$) and ($c_2$), are generated for each data bit input to the encoder. The code symbols ($c_0$), ($c_1$) and ($c_2$) are respectively generated by the generator functions $g_0$, $g_1$ and $g_2$. The code symbols are output from encoder 22 to block interleaver 24. The output code symbols are provided to interleaver 24 in the order of the code symbol ($c_0$) being first, the code symbol ($c_1$) being second and the code symbol ($c_2$) being last. The state of the encoder 22, upon initialization, is the all-zero state. Furthermore the use of tail bits at the end of each frame provides a resetting of encoder 22 to an all-zero state.

The symbols output from encoder 22 are provided to block interleaver 24 which under the control of microprocessor 18 provides a code symbol repetition. Using a conventional random access memory (RAM) with the symbols stored therein as addressed by microprocessor 18, code symbols may be stored in a manner to achieve a code symbol repetition rate that varies with the data channel.

Code symbols are not repeated for the 9.6 kbps data rate. Each code symbol at the 4.8 kbps data rate is repeated 1 time, i.e. each symbol occurs 2 times. Each code symbol at the 2.4 kbps data rate is repeated 3 times, i.e. each symbol occurs 4 times. Each code symbol at the 1.2 kbps data rate is repeated 7 times, i.e. each symbol occurs 8 times. For all data rates (9.6, 4.8, 2.4 and 1.2 kbps), the code repetition results in a constant code symbol rate of 28,800 code symbols per second for the data as output from interleaver 24. On the reverse traffic channel the repeated code symbols are not transmitted multiple times with all but one of the code symbol repetitions deleted prior to actual transmission due to the variable transmission duty cycle as discussed in further detail below. It should be understood that the use of code symbol repetition as an expedient method for describing the operation of the interleaver and a data burst randomizer as discussed again in further detail below. It should be further understood that implementations other than those that use code symbol repetition may be readily devised that achieve the same result and remain within the teaching of the present invention.

All code symbols to be transmitted on the reverse traffic channel and the access channel are interleaved prior to modulation and transmission. Block interleaver 24, constructed as is well known in the art, provides an output of the code symbols over a time period spanning 20 msec. The interleaver structure is typically a rectangular array with 32 rows and 18 columns, i.e. 576 cells. Code symbols are written into the interleaver by columns, with repetition for data at the 9.6, 4.8, 2.4 and 1.2 kbps rate, so as to completely fill the 32×18 matrix. FIGS. 5a–5d illustrate the ordering of write operations of repeated code symbols into the interleaver array for transmission data rates of 9.6, 4.8, 2.4 and 1.2 kbps, respectively.

Reverse traffic channel code symbols are output from the interleaver by rows. Microprocessor 18 also controls the addressing of the interleaver memory for outputting the symbols in the appropriate order. The interleaver rows are preferably output in the following order:

At 9.6 kbps:

1 2 3 4 5 6 7 8 9 10 11 12 13 14 15 16 17 18 19 20 21 22 23 24 25 26 27 28 29 30 31 32

At 4.8 kbps:

1 3 2 4 5 7 6 8 9 11 10 12 13 15 14 16 17 19 18 20 21 23 22 24 25 27 26 28 29 31 30 32

At 2.4 kbps:

1 5 2 6 3 7 4 8 9 13 10 14 11 15 12 16 17 21 18 22 19 23 20 24 25 29 26 30 27 31 28 32

At 1.2 kbps:

1 9 2 10 3 11 4 12 5 13 6 14 7 15 8 16 17 25 18 26 19 27 20 28 21 29 22 30 23 31 24 32.

Access channel code symbols are also output from interleaver 24 by rows. Microprocessor 18 again controls the addressing of the interleaver memory for outputting the symbols in the appropriate order. The interleaver rows are output in the following order at the 4.8 kbps rate for the access channel code symbols:

1 17 9 25 5 21 13 29 3 19 11 27 7 23 15 31 2 18 10 26 6 22 14 30 4 20 12 28 8 24 16 32.

It should be noted that other encoding rates, such as a rate ½ convolutional code used on the forward transmission channel, along with various other symbol interleaving formats may be readily devised using the basic teaching of the present invention.

Figure 6B:
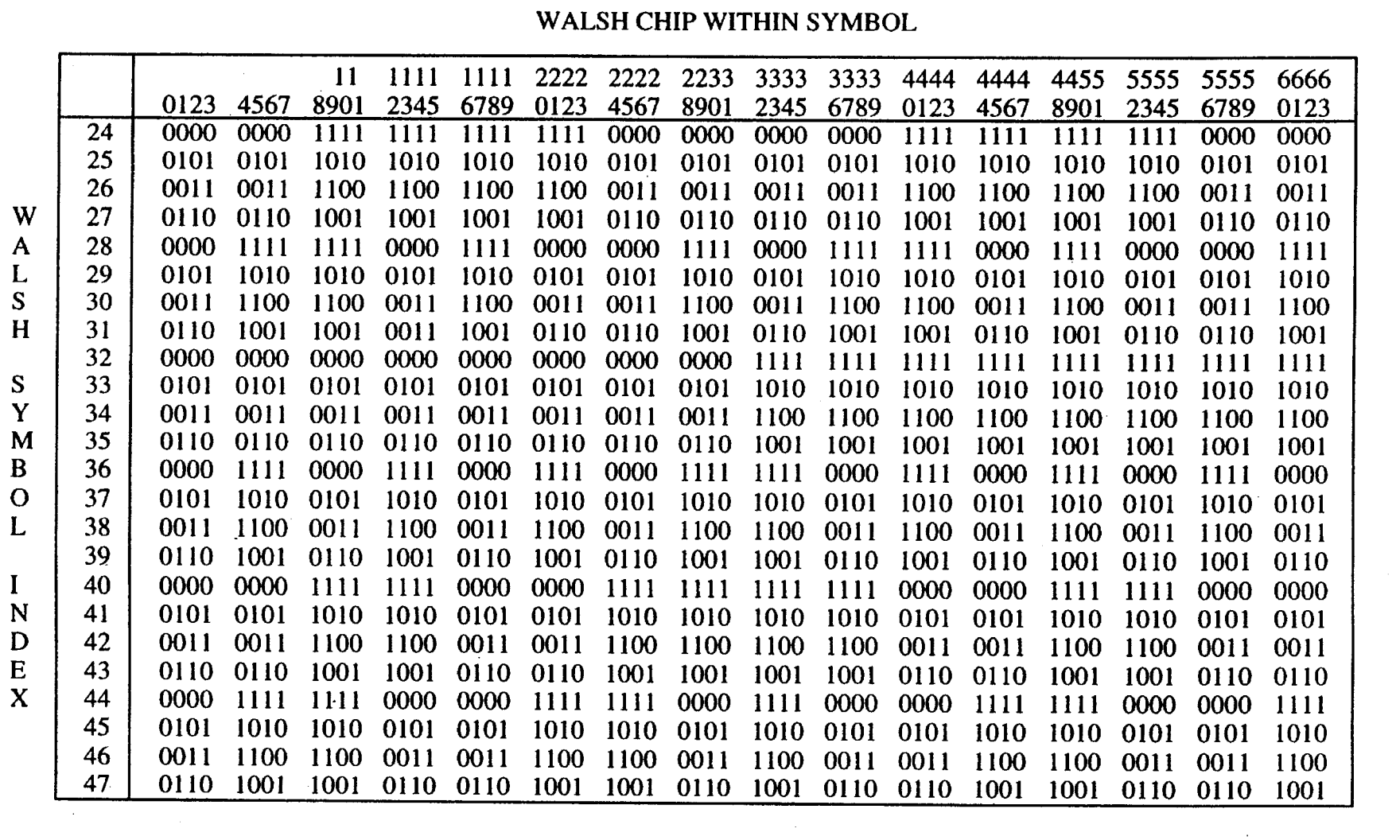

Referring again to FIG. 1, the interleaved code symbols are output from interleaver 24 to modulator 26. In the preferred embodiment modulation for the Reverse CDMA Channel uses 64-ary orthogonal signaling. That is, one of 64 possible modulation symbols is transmitted for each six code symbols. The 64-ary modulation symbol is one of 64 orthogonal waveforms generated preferably using Walsh functions. These modulation symbols are given in FIGS. 6a–6c and are numbered 0 through 63. The modulation symbols are selected according to the following formula:

$$\text{Modulation symbol number} = c_0 + 2c_1 + 4c_2 + 8c_3 + 16c_4 + 32c_5 \quad (3)$$

where $c_5$ shall represent the last or most recent and co the first or oldest binary valued ('0' and '1') code symbol of each group of six code symbols that form a modulation symbol. The period of time required to transmit a single modulation symbol is referred to as a "Walsh symbol" interval and is approximately equal to 208.333 µs. The period of time associated with one-sixty-fourth of the modulation symbol is referred to as a "Walsh chip" and is approximately equal to 3.2552083333 ... µs.

Each modulation or Walsh symbol is output from modulator 26 to one input of a modulo-2 adder, exclusive-OR gate 28. The Walsh symbols are output from modulator at a 4800 sps rate which corresponds to a Walsh chip rate of 307.2 kcps. The other input to gate 28 is provided from long code generator 30 which generates a masked pseudonoise (PN) code, referred to as the long code sequence, in cooperation with mask circuit 32. The long code sequence provided from generator 30 is at a chip rate four times the Walsh chip rate of modulator 26, i.e. a PN chip rate 1.2288 Mcps. Gate 28 combines the two input signals to provide an output of data at the chip rate of 1.2288 Mcps.

The long code sequence is a time shift of a sequence of length $2^{42}-1$ chips and is generated by a linear generator well known in the art using the following polynomial:

$$p(X) = x^{42} + x^{35} + x^{33} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x^1 + 1 \quad (4)$$

Figure 7:
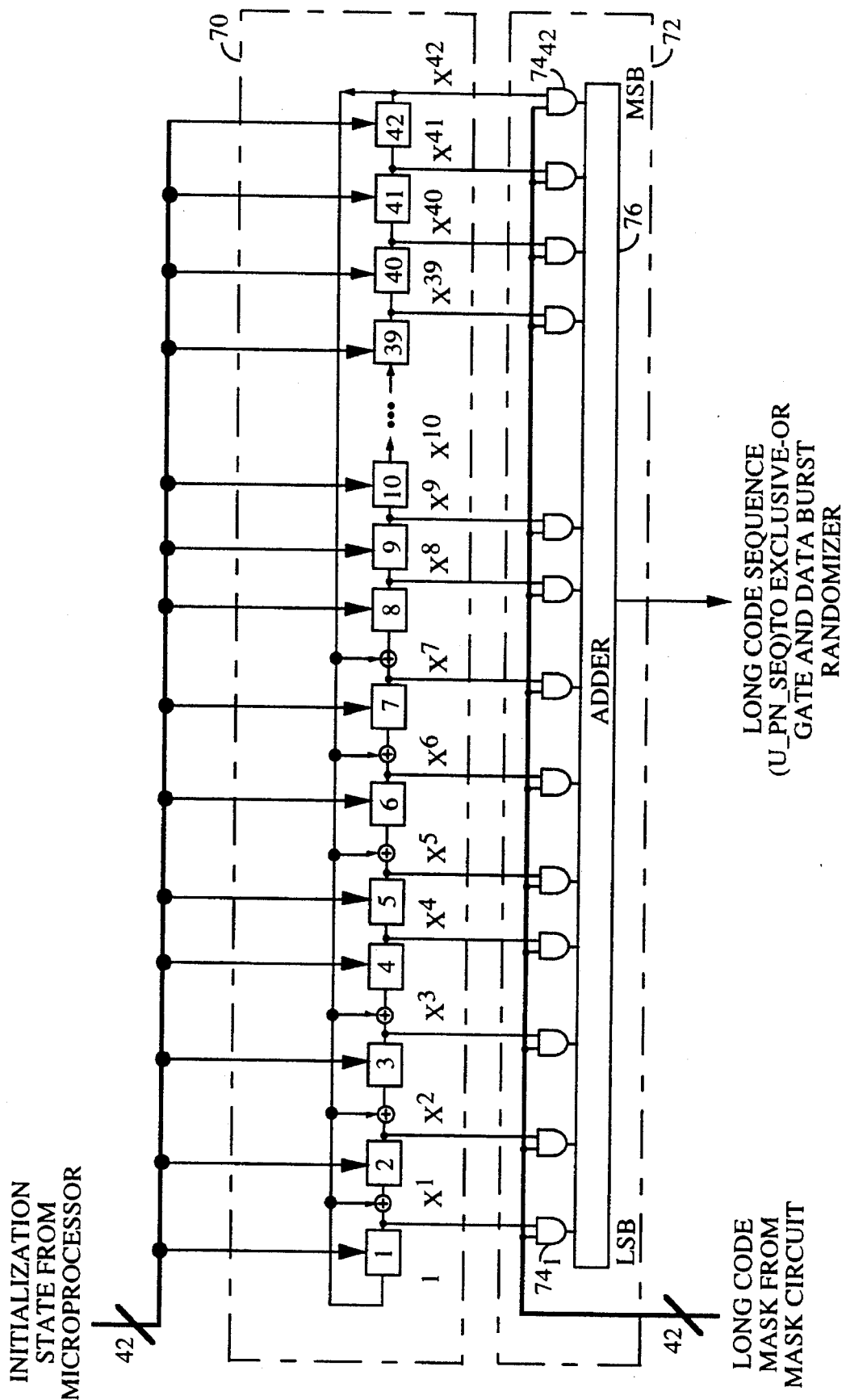
FIG. 7 is a block diagram illustrating the long code generator of FIG. 1.

FIG. 7 illustrates generator 30 in further detail. Generator 30 is comprised of a sequence generator section 70 and a masking section 72. Section 70 is comprised of a sequence of shift registers and modulo-2 adders (typically exclusive-OR gates) coupled together to generate a 42-bit code according to equation 4. The long code is then generated by masking the 42-bit state variables output from section 70 with a 42-bit wide mask provided from mask circuit 32.

Section 72 is comprised of a series of input AND gates $74_1$–$74_{42}$ having one input for receiving a respective mask bit of the 42-bit wide mask. The other input of each of AND gates $74_1$–$74_{42}$ receives the output from a corresponding shift register in section 70. The output of AND gates $74_1$–$74_{42}$ are modulo-2 added by adder 76 to form a single bit output for each 1.2288 MHz clocking of the shift registers of section 70. Adder 76 is typically constructed as a cascaded arrangement of exclusive-OR gates as is well known in the art. Therefore, the actual output PN sequence is generated by the modulo-2 addition of all 42 masked output bits of sequence generator 70 as shown in FIG. 7.

Figure 8A:
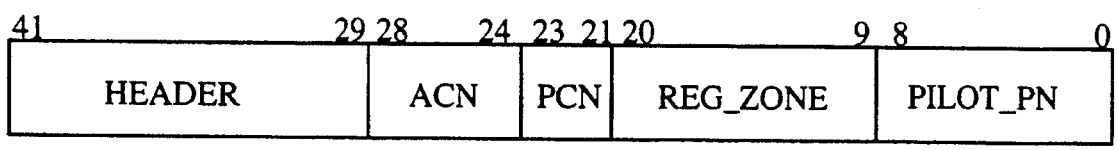
FIGS. 8a–8c are a series of diagrams illustrating long code masks for the various channel type.
Figure 8B:
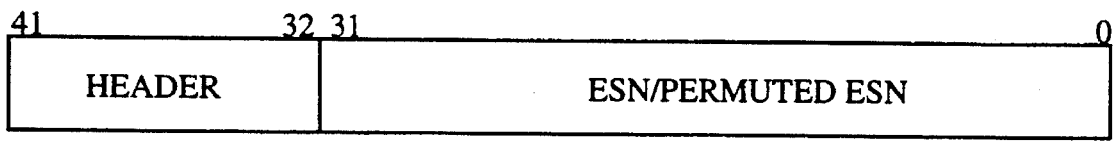
Figure 8C:
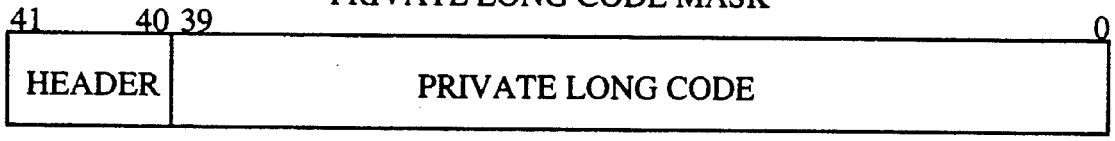
Figure 9A:
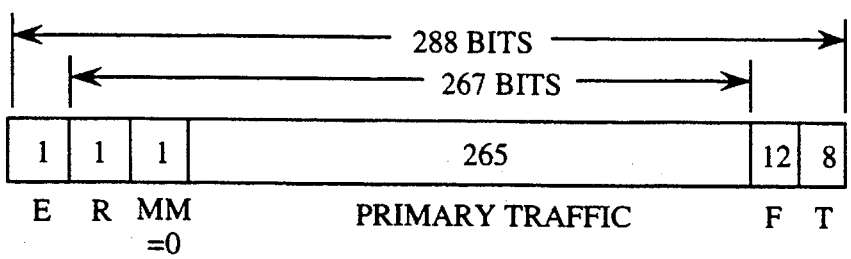
FIGS. 9a–9y are a series of diagrams illustrating frame data formats for the various data rates, types and modes of rate set 2.
Figure 9B:
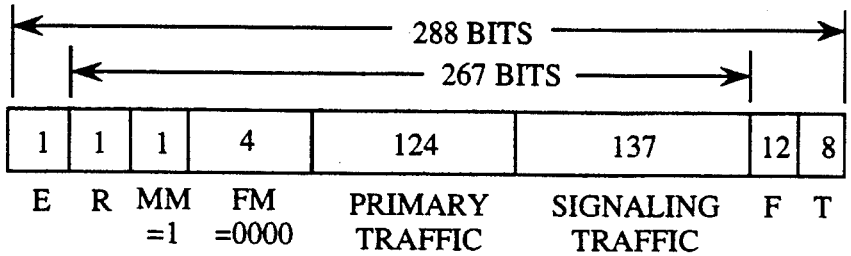
Figure 9C:
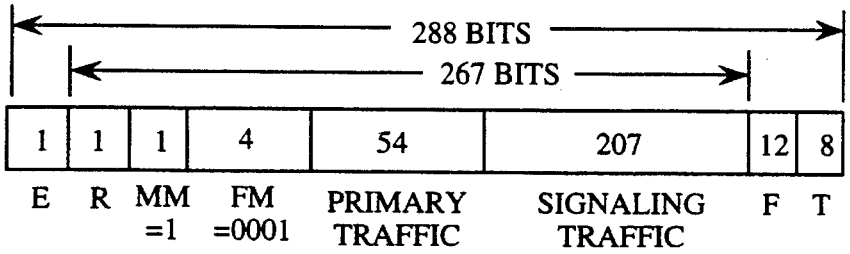
Figure 9D:
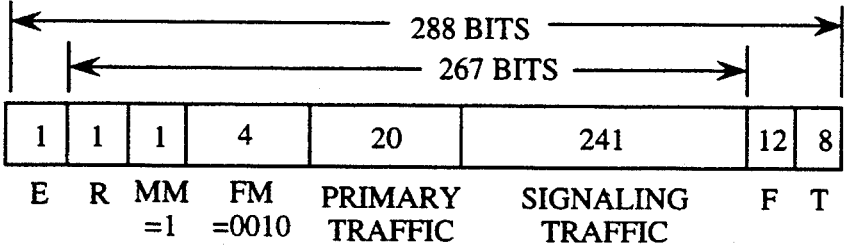
Figure 9E:
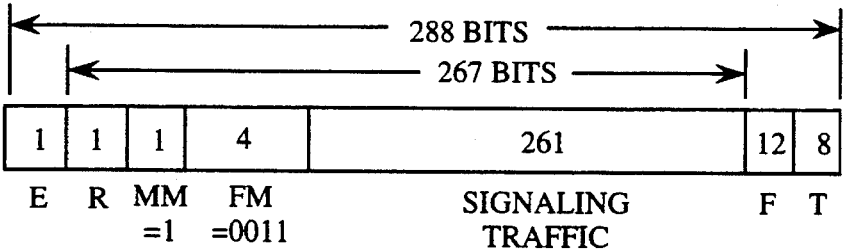
Figure 9F:
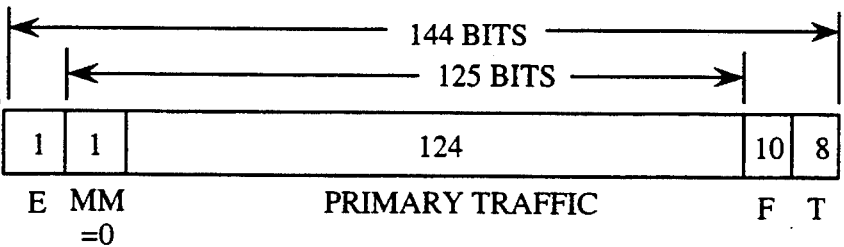
Figure 9G:
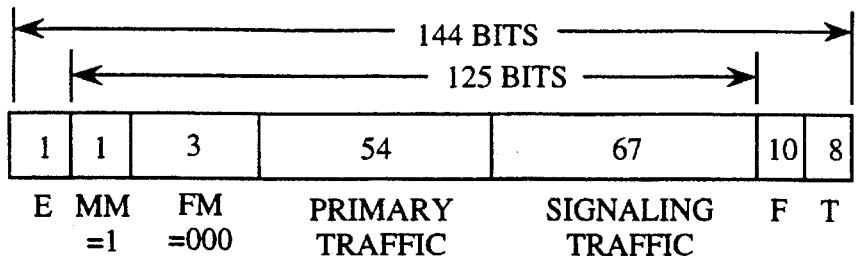
Figure 9H:
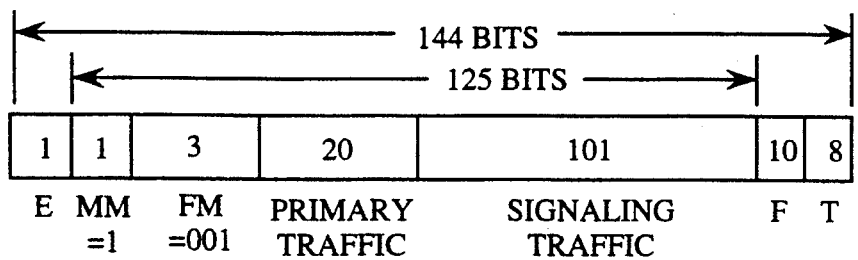
Figure 9I:
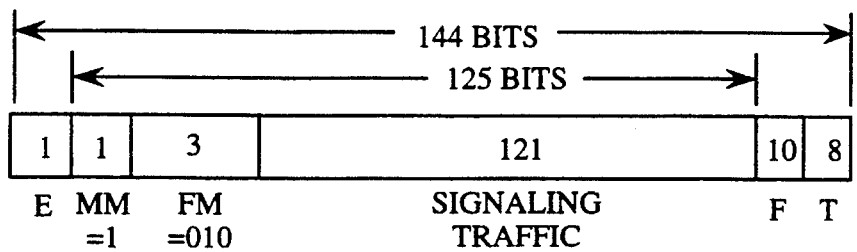
Figure 9J:
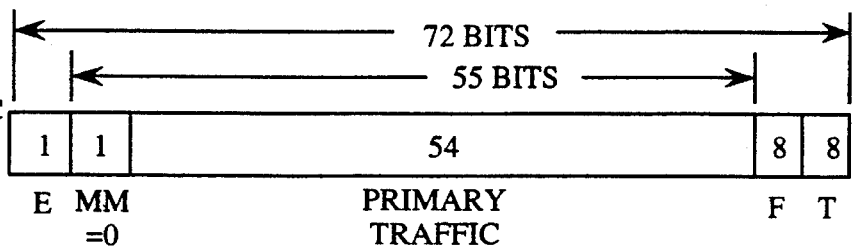
Figure 9K:
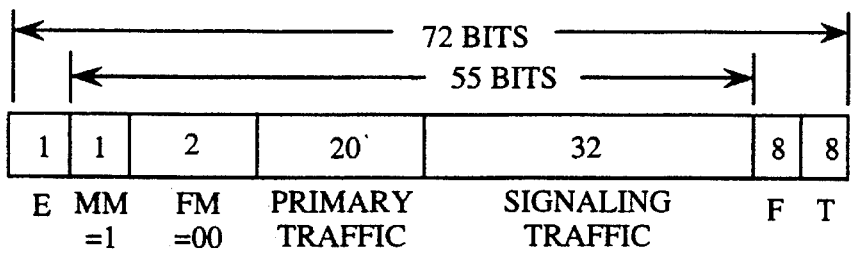
Figure 9L:
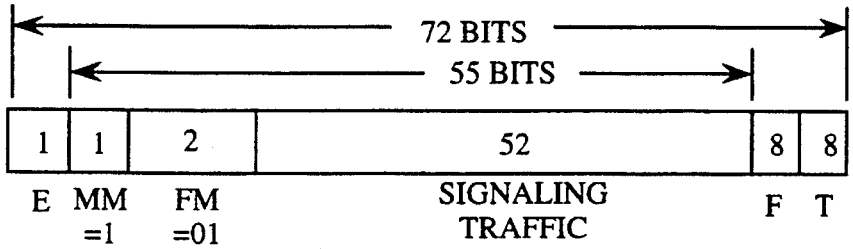
Figure 9M:
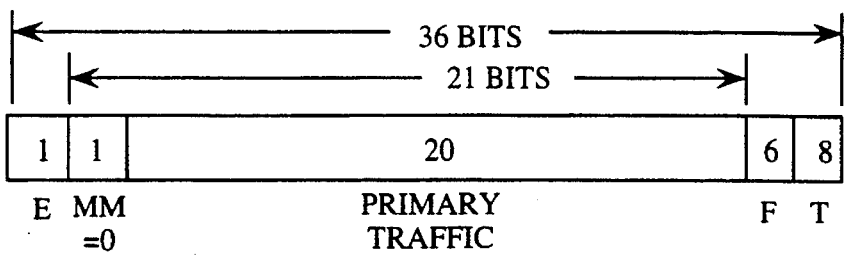
Figure 9N:
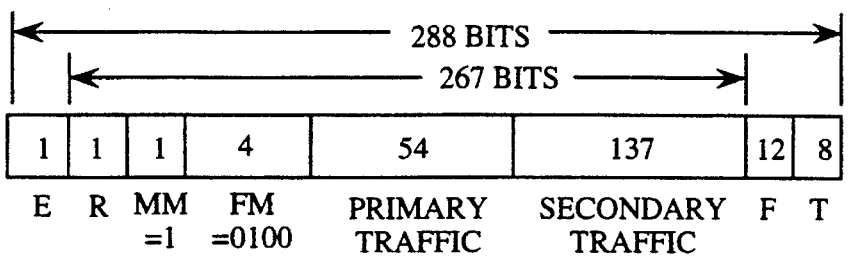
Figure 9O:
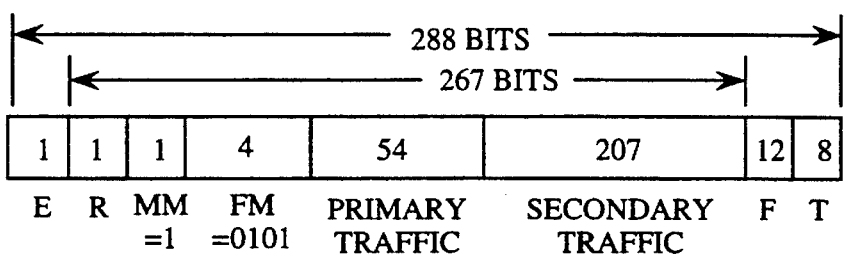
Figure 9P:
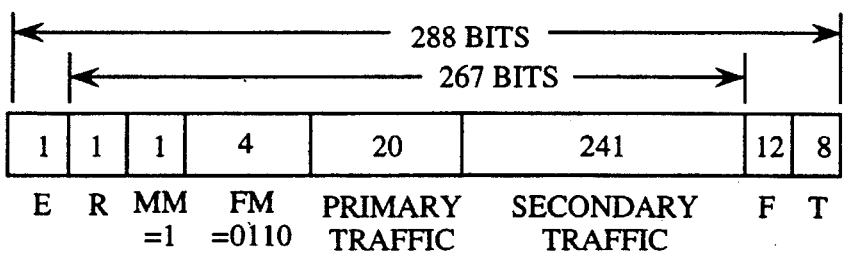
Figure 9Q:
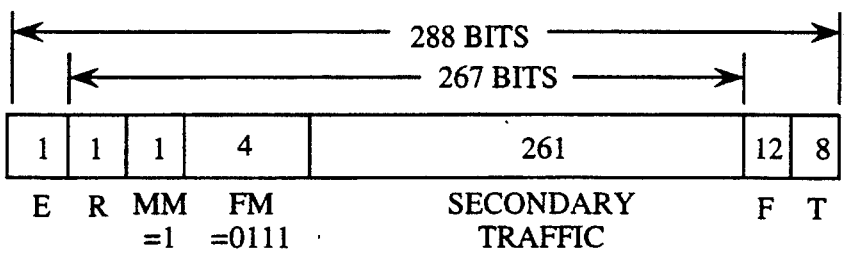
Figure 9R:
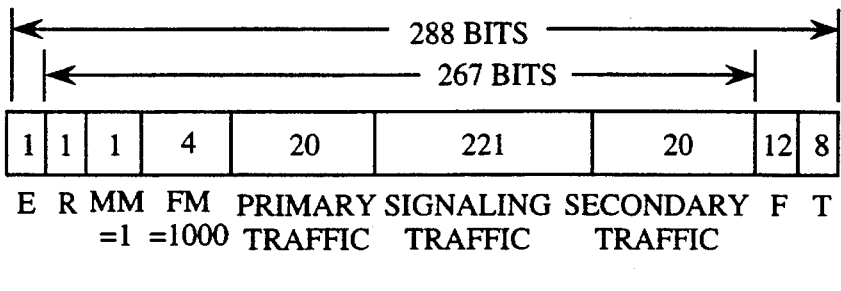
Figure 9S:
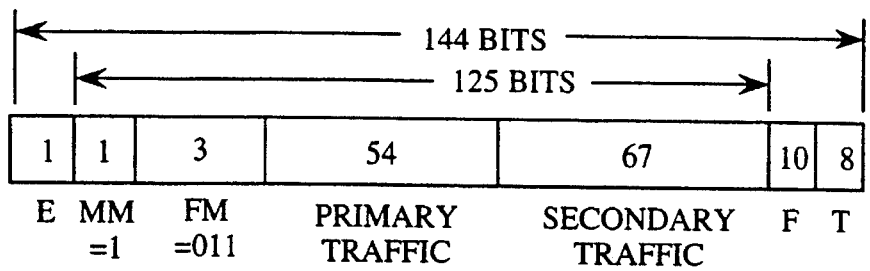
Figure 9T:
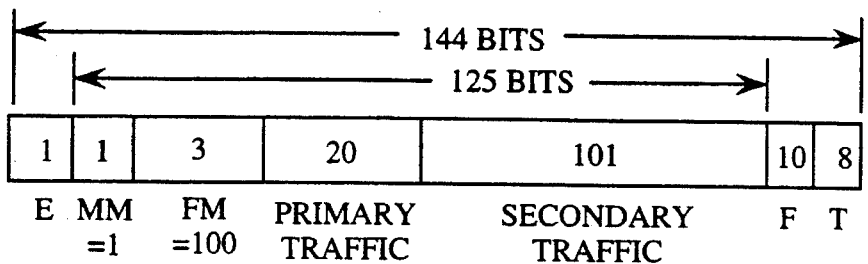
Figure 9U:
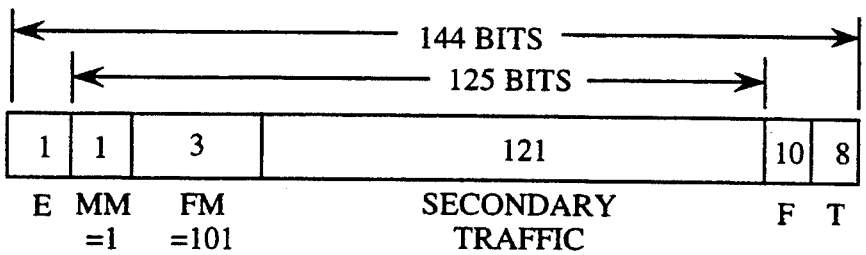
Figure 9V:
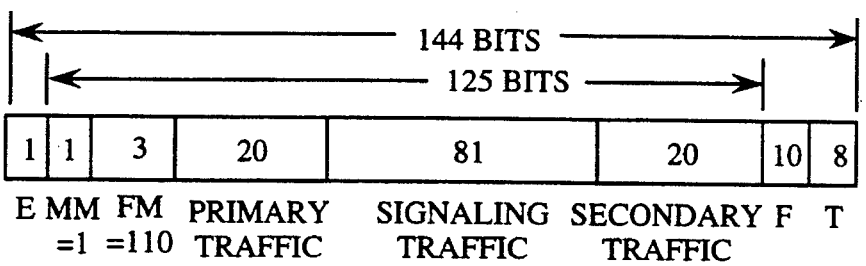
Figure 9W:
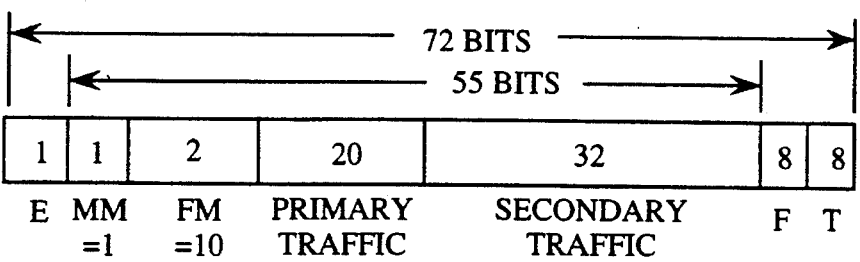
Figure 9X:
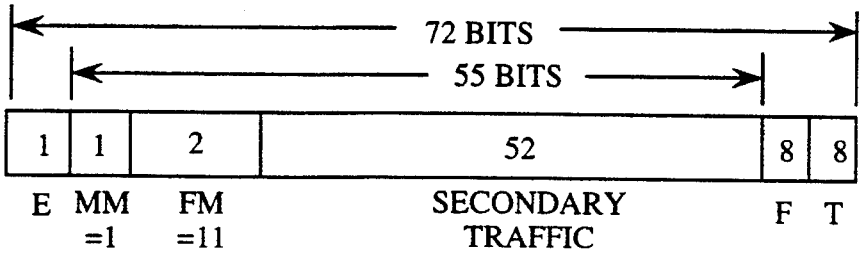
Figure 9Y:
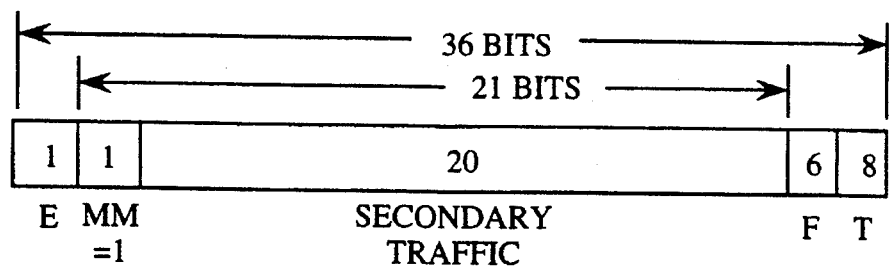

The mask used for the PN spreading shall vary depending on the channel type on which the mobile station is communicating. Referring to FIG. 1, an initialization information is provided from microprocessor 18 to generator 30 and circuit 32. Generator 30 is responsive to the initialization information for initialization of the circuitry. Mask 32 is also responsive to the initialization information, which indicates the mask type to be provided, to output a 42-bit mask. As such, mask circuit 32 may be configured as a memory which contains a mask for each communication channel type. FIGS. 8a–8c provide an exemplary definition of the masking bits for each channel type.

Specifically, when communicating on the Access Channel, the mask is defined as illustrated in FIG. 8a. In the Access Channel mask, mask bits $M_{24}$ through $M_{41}$ are set to '1'; mask bits $M_{19}$ through $M_{23}$ are set to the chosen Access Channel number; mask bits $M_{16}$ through $M_{18}$ are set to the code channel for the associated Paging Channel, i.e. the range typically being 1 through 7; mask bits $M_9$ through $M_{15}$ are set to the registration zone; for the current base station; and mask bits $M_0$ through $M_8$ are set to the pilot PN value for the current CDMA Channel.

When communicating on the Reverse Traffic Channel, the mask is defined as illustrated in FIG. 8b. The mobile station uses one of two long codes unique to that mobile station: a public long code unique to the mobile station's electronic serial number (ESN); and a private long code unique for each mobile identification number (MIN) which is typically the telephone number of the mobile station. In the public long code the mask bits $M_{32}$ through $M_{41}$ are set to '0,' and the mask bits $M_0$ through $M_{31}$ are set to the mobile station ESN value.

It is further envisioned that a private long code may be implemented as illustrated in FIG. 8c. The private long code will provide additional security in that it will only be known to the base station and the mobile station. The private long code will not be transmitted in the clear over the transmission medium. In the private long code the mask bit $M_{40}$ through $M_{41}$ are set to '0' and '1' respectively; while mask bits $M_0$ through $M_{39}$ may be set to according to a predetermined assignment scheme.

Referring back to FIG. 1 the output of gate 28 is respectively provided as one input to each one of a pair of modulo-2 adders, exclusive-OR gates 34 and 36. The other input to each of gates 34 and 36 are second and third PN sequences are I and Q channel "short codes" respectively generated by I and Q Channel PN generators 38 and 40. The Reverse Access Channel and Reverse Traffic Channel is therefore OQPSK spread prior to actual transmission. This offset quadrature spreading on the Reverse Channel uses the same I and Q PN codes as the Forward Channel I and Q pilot PN codes. The I and Q PN codes generated by generators 38 and 40 are of length $2^{15}$ and are preferably the zero-time offset codes with respect to the Forward Channel. For purposes of further understanding, on the Forward Channel a pilot signal is generated for each base station. Each base station pilot channel signal is spread by the I and Q PN codes as just mentioned. Base station I and Q PN codes are offset from one another, by a shifting of the code sequence, so as to provide a distinction between base station transmission. The generating functions for the I and Q short PN codes shall be as follows:

$$P_I(x) = x^{15} + x^{13} + x^9 + x^8 + x^7 + x^5 + 1 \quad (5)$$

and $$P_Q(x) = x^{15} + x^{12} + x^{11} + x^{10} + x^6 + x^5 + x^4 + x^3 + 1. \quad (6)$$

Generators 38 and 40 may be constructed as is well known in the art so as to provide an output sequence in accordance with equations (5) and (6).

The I and Q waveforms are respectively output from gates 34 and 36 where respectively provided as inputs to finite impulse response (FIR) filters 42 and 44. FIR filters 42 and 44 are digital filters which bandlimit the resulting I and Q waveforms. These digital filters shape the I and Q waveforms such that the resulting spectrum is contained within a given spectral mask. Filters 42 and 44 may be constructed according to well known digital filter techniques and preferably provide a desired frequency response.

The binary '0' and '1' inputs to digital filters 42 and 44, generated by the PN spreading functions, are mapped into +1 and −1, respectively. The sampling frequency of the digital filter is 4.9152 MHz=4×1.2288 MHz. An additional binary '0' and '1' input sequence synchronous with the I and Q digital waveforms shall be provided to each of digital filters 42 and 44. This particular sequence, referred to as a masking sequence, is the output generated by a data burst randomizer. The masking sequence multiplies the I and Q binary waveforms to produce a ternary (−1, 0, and +1) input to the digital filters 42 and 44.

As discussed previously the data rate for transmission on the Reverse Traffic Channel is at one of the rates of equal 9.6, 4.8, 2.4, or 1.2 kbps and varies on a frame-by-frame basis. Since the frames are of a fixed 20 ms length for both the Access Channel and the Reverse Traffic Channel, the number of information bits per frame shall be 192, 96, 48, or 24 for transmission at data rates of 9.6, 4.8, 2.4, or 1.2 kbps, respectively. As described previously, the information is encoded using a rate ⅓ convolutional encoder and then the code symbols shall be repeated by a factor of 1, 2, 4, or 8 for a data rate of 9.6, 4.8, 2.4, or 1.2 kbps, respectively. The resulting repetition code symbol rate is thus fixed at 28,800 symbols per second (sps). This 28,800 sps stream is block interleaved as previously described.

Prior to transmission, the Reverse Traffic Channel interleaver output stream is gated with a time filter that allows transmission of certain interleaver output symbols and deletion of others. The duty cycle of the transmission gate thus varies with the transmit data rate. When the transmit data rate is 9.6 kbps, the transmission gate allows all interleaver output symbols to be transmitted. When the transmit data rate is 4.8 kbps, the transmission gate allows one-half of the interleaver output symbols to be transmitted, and so forth. The gating process operates by dividing the 20 msec frame into 16 equal length (i.e., 1.25 ms) periods, called power control groups. Certain power control groups are gated on (i.e., transmitted), while other groups are gated off (i.e., not transmitted).

The assignment of gated-on and gated-off groups is referred to as a data burst randomizer function. The gated-on power control groups are pseudo-randomized in their positions within the frame so that the actual traffic load on the Reverse CDMA Channel is averaged, assuming a random distribution of the flames for each duty cycle. The gated-on power control groups are such that every code symbol input to the repetition process shall be transmitted once without repetition. During the gated-off periods, the mobile station does not transmit energy, thus reducing the interference to other mobile stations operating on the same Reverse CDMA Channel. This symbol gating occurs prior to transmission filtering.

The transmission gating process is not used when the mobile station transmits on the Access Channel. When transmitting on the Access Channel, the code symbols are repeated once (each symbol occurs twice) prior to transmission.

In the implementation of the data burst randomizer function, data burst randomizer logic 46 generates a masking stream of 0's and 1's that randomly mask out the redundant data generated by the code repetition. The masking stream pattern is determined by the frame data rate and by a block of 14 bits taken from the long code sequence generated by generator 30. These mask bits are synchronized with the data flow and the data is selectively masked by these bits through the operation of the digital filters 42 and 44. Within logic 46 the 1.2288 MHz long code sequence output from generator 30 is input to a 14-bit shift register, which is shifted at a 1.2288 MHz rate. The contents of this shift register are loaded into a 14-bit latch exactly one power control group (1.25 ms) before each Reverse Traffic Channel frame boundary. Logic 46 uses this data along with the rate input from microprocessor 18, to determine, according to a predetermined algorithm, the particular power control group(s) in which the data is to be allowed to pass through filters 42 and 46 for transmission. Logic 46 thus outputs for each power control group a '1' or '0' for the entire power control group depending on whether the data is to be filtered out ('0') or passed through ('1'). At the corresponding receiver, which also uses the same long code sequence and a corresponding rate determined for the frame, determines the appropriate power control group(s) in which the data is present.

The I channel data output from filter 42 is provided directly to a digital to analog (D/A) converter and anti-aliasing filter circuit 50. The Q channel data however is output from filter 44 to a delay element 48 which a one-half PN chip time delay (406.9 nsec) in the Q channel data. The Q channel data is output from delay element 48 to digital to analog (D/A) converter and anti-aliasing filter circuit 52. Circuits 50 and 52 convert the digital data to analog form and filter the analog signal. The signals output from circuits 50 and 52 are provided to Offset Quadrature Phase Shift Key (OQPSK) modulator 54 where modulated and output to RF transmitter circuit 56. Circuit 56 amplifies, filters and frequency upconverts the signal for transmission. The signal is output from circuitry 56 to antenna 58 for communication to the base station.

It should be understood that the exemplary embodiment of the present invention discusses the formatting of data for modulation and transmission with respect to a mobile station. It should be understood that the data formatting is the same for a cell base station, however the modulation may be different.

In an improved embodiment, the present invention may be designed to operate with two alternative sets of data rates. In the first exemplary embodiment, primary traffic is transmitted in frames at the 9.6 kbps, 4.8 kbps, 2.4 kbps and 1.2 kbps rates. These rates comprise a set of data rates referred to herein as rate set 1. In an improved embodiment of the present invention, primary traffic can also be transmitted in frames at the rates of 14.4 kbps, 7.2 kbps, 3.6 kbps and 1.8 kbps thus permitting higher rate vocoders and other data. These rates comprise a set of data rates referred to herein as rate set 2. Transmission of data provided at rates within rates set 1 proceeds as described previously. Transmission of rate set 2 frames of data proceeds in a similar manner with slight differences in the generation of frame quality indicator (CRC) bits, the allocation of bits in a frame, and the convolutional encoding of the frames. The differences are described in detail below.

In the exemplary embodiment of the present invention, the frames of rate set 1 are convolutionally encoded at a different rate than frames of rate set 2. Rate set 1 frames are convolutionally encoded at rate ⅓, while rate set 2 frames are convolutionally encoded at rate ½. In the exemplary embodiment two separate convolutional encoders are provided. Convolutional encoder 22 is a rate ⅓ convolutional encoder for the encoding of rates set 1 frames and convolutional encoder 23 is a rate ½ convolutional encoder for the encoding of rate set 2 frames. Switch 21 receives a RATE SET signal from microprocessor 18 and accordingly directs the frame to the correct convolutional encoder.

It should be noted that the encoded symbol rates from convolutional encoder 23 are 28.8 ksps, 14.4 ksps, 7.2 ksps and 3.6 ksps are the same rates provided from convolutional encoder 22. This allows the transmission of rate set 2 frames following the convolutional encoding of the frames to proceed identically as described previously for rate set 1 frames.

In the exemplary embodiment, the generator polynomials for the frame quality indicator used in generator 20, rate set 2 frames are as follows:

$$g(x)=x^{12}+x^{11}+x^{10}+x^9+x^8+x^4+x+1, \quad (7)$$

for the 12-bit frame quality indicator;

$$g(x)=x^{10}+x^9+x^8+x^7+x^6+x^4+x^3+1 \quad (8)$$

for the 10-bit frame quality indicator;

$$g(x)=x^8+x^7+x^4+x^3+x+1 \quad (9)$$

for the 8-bit frame quality indicator; and $$g(x)=x^6+x^2+x+1 \quad (10)$$

for the 6-bit frame quality indicator.

The design and implementation of encoders to generate frame quality indicator bits using these polynomials is the same as those described with respect to rate set 1.

A final distinction between rate set 2 frames and rate set 1 frames is the inclusion of an erasure indicator bit. An erasure indicator bit is a feedback signal from the receiving system of the communications device to a remote transmitting device to indicate that a frame erasure has occurred. In the exemplary embodiment this bit is set when the personal station is unable to decide upon the data rate of the received frame or errors are detected. This bit may be based upon other forms of received signal quality metrics such as received signal strength. In response the remote transmitting device can respond to strengthen its signal by increasing its transmission energy or by decreasing its data rate. The erasure bit may be set by either microprocessor 18 or by an additional element, erasure indicator element 19, both of which would operate in conjunction with a FRAME ERASURE SIGNAL from the receiving system of the communications device (not shown).

Table II shown below illustrates the contents of the exemplary frames of both data rate sets. As described previously, for rate set 1 frames, 9600 bps frames comprise 172 information bits, 12 frame quality indicator bits and 8 tail bits, 4800 bps frames comprise 80 information bits, 8 frame quality indicator bits and 8 tail bits, 2400 bps frames comprise 40 information bits and 8 tail bits, and 1200 bps frames comprise 16 information bits and 8 tail bits. For rate set 2 frames, 14,400 bps frames comprise 267 information bits, 1 erasure indicator bit, 12 frame quality indicator bits and 8 tail bits, 7200 bps frames comprise 125 information bits, 1 erasure indicator bit, 10 frame quality indicator bits and 8 tail bits, 3600 bps frames comprise 55 information bits, 1 erasure indicator bit, 8 frame quality indicator bits and 8 tail bits, and 1800 bps frames comprise 21 information bits, 1 erasure indicator bit, 6 frame quality indicator bits and 8 tail bits.

TABLE II

| Rate Set | Transmission Rate (bps) | Number of Bits per Frame | | | | |
|---|---|---|---|---|---|---|
| | | Total | Erasure Indicator | Information | Frame Quality Indicator | Encoder Tail |
| 1 | 9600 | 192 | 0 | 172 | 12 | 8 |
| | 4800 | 96 | 0 | 80 | 8 | 8 |
| | 2400 | 48 | 0 | 40 | 0 | 8 |
| | 1200 | 24 | 0 | 16 | 0 | 8 |
| 2 | 14400 | 288 | 1 | 267 | 12 | 8 |
| | 7200 | 144 | 1 | 125 | 10 | 8 |
| | 3600 | 72 | 1 | 55 | 8 | 8 |
| | 1800 | 36 | 1 | 21 | 6 | 8 |

FIGS. 10a–10y illustrate the frame format for frames generated within rate set 2. In FIG. 10a, a 14.4 kbps frame is illustrated for transmission of full rate primary traffic. One bit is provided for the erasure indicator bit described above and one reserved bit is provided. A mixed mode bit is set to zero to indicate that the frame consists only of primary traffic data. 265 primary traffic bits are then provided, followed by 12 frame quality indicator bits and 8 tail bits.

In FIG. 10b, a 14.4 kbps dim and burst frame is illustrated for transmission of half rate primary traffic and signaling traffic. One bit is provided for the erasure indicator bit and one reserved bit is provided. The mixed mode bit is set to 1 to indicate that the packet consists of data other than primary traffic only. Four frame mode bits are provided to indicate the types of data in the packet. The frame mode bits are set to 0000 to indicate that the data present in the packet is half rate primary traffic and signaling traffic. There are 124 bits of primary traffic and 137 bits of signaling traffic. The frame is accompanied by 12 frame quality indicator bits and 8 tail bits.

In FIG. 10c, a 14.4 kbps dim and burst frame is illustrated for transmission of quarter rate primary traffic and signaling traffic. One bit is provided for the erasure indicator bit and one reserved bit is provided. The mixed mode bit is set to 1. The frame mode bits are set to 0001 to indicate that the data present in the packet is quarter rate primary traffic and signaling traffic. There are 54 bits of primary traffic and 207 bits of signaling traffic. The frame is accompanied by 12 frame quality indicator bits and 8 tail bits.

In FIG. 10d, a 14.4 kbps dim and burst frame is illustrated for transmission of eighth rate primary traffic and signaling traffic. One bit is provided for the erasure indicator bit and one reserved bit is provided. The mixed mode bit is set to 1. The frame mode bits are set to 0010 to indicate that the data present in the packet is eighth rate primary traffic and signaling traffic. The frame has 20 bits of primary traffic and 241 bits of signaling traffic and contains 12 frame quality indicator bits and 8 tail bits.

In FIG. 10e, a 14.4 kbps blank and burst frame is illustrated for transmission of signaling traffic. One bit is provided for the erasure indicator bit and one reserved bit is provided. The mixed mode bit is set to 1. The frame mode bits are set to 0011 to indicate that the data present in the packet is signaling traffic. There are 261 bits of signaling traffic, 12 frame quality indicator bits and 8 tail bits.

In FIG. 10f, a 7.2 kbps frame is illustrated for transmission of half rate primary traffic only. An erasure indicator bit is provided. The mixed mode bit is set to 0. There are 124 bits of primary traffic provided, 10 frame quality indicator bits and 8 tail bits.

In FIG. 10g, a 7.2 kbps dim and burst frame is illustrated for transmission of quarter rate primary traffic with signaling traffic. An erasure indicator bit is provided. The mixed mode bit is set to 1. Three frame mode bits are set to 000. There are 54 bits of primary traffic, 67 bits of signaling traffic, 10 frame quality indicator bits and 8 tail bits.

In FIG. 10h, a 7.2 kbps dim and burst frame is illustrated for transmission of eighth rate primary traffic with signaling traffic. An erasure indicator bit is provided. The mixed mode bit is set to 1. Three frame mode bits are set to 001. There are 20 bits of primary traffic, 101 bits of signaling traffic, 10 frame quality indicator bits and 8 tail bits.

In FIG. 10i, a 7.2 kbps blank and burst frame is illustrated for transmission of signaling traffic. An erasure indicator bit is provided. The mixed mode bit is set to 1. Three frame mode bits are set to 010. There are 121 bits of signaling traffic, 10 frame quality indicator bits and 8 tail bits.

In FIG. 10j, a 3.6 kbps frame is illustrated for transmission of quarter rate primary traffic only. An erasure indicator bit is provided. The mixed mode bit is set to 0. No frame mode bits are provided. There are 54 bits of primary traffic, 8 frame quality indicator bits and 8 tail bits.

In FIG. 10k, a 3.6 kbps dim and burst frame is illustrated for transmission of eighth rate primary traffic with signaling traffic. An erasure indicator bit is provided. The mixed mode bit is set to 1. Two frame mode bits are set to 00. There are 20 bits of primary traffic, 32 bits of signaling traffic, 8 frame quality indicator bits and 8 tail bits.

In FIG. 10l, a 3.6 kbps blank and burst frame is illustrated for transmission of signaling traffic. An erasure indicator bit is provided. The mixed mode bit is set to 1. Two frame mode bits are set to 01. There are 52 bits of signaling traffic, 8 frame quality indicator bits and 8 tail bits.

In FIG. 10m, a 1.8 kbps frame is illustrated for transmission of eighth rate primary traffic only. An erasure indicator bit is provided. The mixed mode bit is set to 0. No frame mode bits are provided. There are 20 bits of primary traffic, 6 frame quality indicator bits and 8 tail bits.

In FIG. 10n, a 14.4 dim and burst frame is illustrated for transmission of half rate primary traffic and secondary traffic. An erasure indicator bit is provided with a reserved bit. The mixed mode bit is set to 1. The frame mode bits are set to 0100 to indicate that the data present in the packet is half rate primary traffic and signaling traffic. There are 124 bits of primary traffic, 137 bits of secondary traffic, 12 frame quality indicator bits and 8 tail bits.

In FIG. 10o, a 14.4 kbps dim and burst frame is illustrated for transmission of quarter rate primary traffic and secondary traffic. An erasure indicator bit is provided along with a reserved bit. The mixed mode bit is set to 1. The four frame mode bits are set to 0101 to indicate that the data present in the packet is quarter rate primary traffic plus secondary traffic. There are 54 bits of primary traffic, 207 bits of secondary traffic, 12 frame quality indicator bits and 8 tail bits.

In FIG. 10p, a 14.4 kbps dim and burst frame is illustrated for transmission of a frame consisting of eighth rate primary traffic and secondary traffic. An erasure indicator bit is provided with a reserved bit. The mixed mode bit is set to 1. The frame mode bits are set to 0110 to indicate that the data present in the packet is eighth rate primary traffic plus secondary traffic. There are 20 bits of primary traffic, 241 bits of secondary traffic, 12 frame quality indicator bits and 8 tail bits.

In FIG. 10q, a 14.4 kbps blank and burst frame is illustrated for transmission of secondary traffic. An erasure indicator bit is provided along with a reserved bit. The mixed mode bit is set to 1. The four frame mode bits are set to 0111. There are 261 bits of secondary traffic, 12 frame quality indicator bits and 8 tail bits.

FIG. 10r illustrates a 14.4 kbps dim and burst frame for the transmission of eighth rate primary data, secondary and signaling traffic. An erasure indicator bit is provided with a reserved bit. The mixed mode bit is set to 1. The frame mode bits are set to 1000 to indicate that the data present in the packet is eighth rate primary data, secondary and signaling traffic. There are 20 bits of primary traffic, 221 bits of signaling traffic, 20 bits of secondary traffic, 12 frame quality indicator bits and 8 tail bits.

FIG. 10s illustrates a 7.2 kbps dim and burst frame with quarter rate primary and secondary traffic. An erasure indicator bit is provided. The mixed mode bit is set to 1. The frame mode bits are set to 011. There are 54 bits of primary traffic, 67 bits of secondary traffic, 12 frame quality indicator bits and 8 tail bits.

FIG. 10t illustrates a 7.2 kbps dim and burst frame with eighth rate primary and secondary traffic. An erasure indicator bit is provided. The mixed mode bit is set to 1. The frame mode bits are set to 100. There are 20 bits of primary traffic, 101 bits of secondary traffic, 10 frame quality indicator bits and 8 tail bits.

FIG. 10u illustrates a 7.2 kbps blank and burst frame with secondary traffic only. An erasure indicator bit is provided. The mixed mode bit is set to 1. The frame mode bits are set to 101. There are 121 bits of secondary traffic, 10 frame quality indicator bits and 8 tail bits.

FIG. 10v illustrates a 7.2 kbps dim and burst frame with eighth rate primary traffic, secondary and signaling traffic. An erasure indicator bit is provided. The mixed mode bit is set to 1. The frame mode bits are set to 110. There are 20 bits of primary traffic, 81 bits of signaling traffic, 20 bits of secondary traffic, 10 frame quality indicator bits and 8 tail bits.

FIG. 10w illustrates a 3.6 kbps dim and burst frame with eighth rate primary traffic and secondary traffic. An erasure indicator bit is provided. The mixed mode bit is set to 1. The frame mode bits are set to 10. There are 20 bits of primary traffic, 32 bits of secondary traffic, 8 frame quality indicator bits and 8 tail bits.

FIG. 10x illustrates a 3.6 kbps blank and burst frame with secondary traffic only. An erasure indicator bit is provided. The mixed mode bit is set to 1. The frame mode bits are set to 11. There are 52 bits of secondary traffic, 8 frame quality indicator bits and 8 tail bits.

FIG. 10y illustrates a 1.8 kbps blank and burst frame with secondary traffic only. An erasure indicator bit is provided. The mixed mode bit is set to 1. There are 20 bits of secondary traffic, 6 frame quality indicator bits and 8 tail bits.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a communication system, a method for transmitting a first data frame at a data rate included within a first predetermined data rate set of a set of rate sets, comprising the steps of:

receiving said data frame;

generating a set of parity check bits and tail bits in accordance with a frame rate of said first data frame;

encoding an augmented data frame derived from said first data frame, said parity check bits, and said tail bits, wherein an encoding rate of said encoding is determined in accordance with said first predetermined data rate set of said first data frame; and transmitting said encoded augmented data frame.

2. The method of claim 1 further including the step of transmitting a second data frame at a selected data rate included within a second predetermined set of data rates, wherein there is a multiplicative factor between corresponding data rates of said first predetermined data rate set and said second predetermined data rate set.

3. The method of claim 2 wherein encoding rates associated with said first predetermined data rate set and said second predetermined data rate set are related by an encoding factor inversely proportional to said multiplicative factor.

4. In a communication system, a method for transmitting a first data frame at a given data rate included within a first predetermined set of data rates, comprising the steps of:

receiving said first data frame and a frame rate indication associated therewith;

generating a formatted data frame by formatting said first data frame in accordance with a predetermined format corresponding to said frame rate indication;

encoding said formatted data frame; and transmitting said encoded formatted data frame.

5. In a communication system, a method for transmitting first and second data frames at first and second data rates, respectively, said first and second data rates being respectively included first and second predetermined sets of data rates, comprising the steps of:

receiving said first and second data frames and first and second frame rate indications respectively associated with said first and second data frames;

generating first and second formatted data frames by formatting said first and second data frames in accordance with first and second predetermined formats corresponding to said first and second frame rate indications, respectively;

encoding said first and second formatted data frames; and transmitting said first and second encoded formatted data frames.

6. In a communication system, a method for transmitting information from a subscriber unit to a base station comprising the steps of:

providing a first data frame including traffic channel data of a first type;

generating a formatted data frame of a predetermined format using said first data frame, said formatted data frame including at least one frame quality bit;

encoding said formatted data frame at an encoding rate based upon a frame rate associated with said first data frame; and transmitting said encoded formatted data frame.

7. The method of claim 6 further including the step of inserting at least one tail bit into said formatted data frame.

8. The method of claim 6 further including the steps of:

providing a second data frame including traffic channel data of a second type, and generating said formatted data frame using both said first and said second data frame.

9. The method of claim 6 wherein said first type of traffic channel data corresponds to primary traffic data.

10. The method of claim 8 wherein said first type of traffic channel data corresponds to primary traffic data, and wherein said second type of traffic channel data corresponds to secondary traffic data.

11. The method of claim 8 wherein said first type of traffic channel data corresponds to primary traffic data, and wherein said second type of traffic channel data corresponds to signaling traffic data.

12. The method of claim 8 further comprising the step of including, within said formatted data frame:

at least one tail bit, an erasure indicator bit providing an indication of frame erasure, a mixed mode bit indicative of the inclusion of said second type of traffic channel data within said formatted data frame, and one or more frame mode bits for identifying said first and second types of traffic channel data.

13. The method of claim 6 further comprising the step of including, within said formatted data frame:

at least one tail bit, an erasure indicator bit providing an indication of frame erasure, and one or more frame mode bits for identifying said first type of traffic channel data.

14. The method of claim 12 wherein said one or more frame mode bits further identify first and second frame rates respectively associated with said first and second types of traffic channel data.

15. The method of claim 13 wherein said one or more frame mode bits further identify a frame rate associated with said first type of traffic channel data.

16. In a communication system, a method for transmitting comprising the steps of:

providing a first data frame including traffic channel data of a first type;

generating a formatted data frame of a predetermined format, said formatted data frame sequentially including an erasure indicator bit,
a mixed mode bit,
one or more frame mode bits,
a plurality of bits of said traffic channel data of said first type,
one or more frame quality indicator bits, and
one or more tail bits;

encoding said formatted data frame; and transmitting said encoded formatted data frame.

17. The method of claim 16 further comprising the step of including, within said formatted data frame, a plurality of bits of said traffic channel data of a second type between said plurality of bits of said traffic channel data of said first type and said one or more frame quality indicator bits.

18. The method of claim 16 further comprising the step of including, within said formatted data frame, a reserved bit between said erasure indicator bit and said mixed mode bit.

19. The method of claim 16 wherein said traffic channel data of said first type corresponds to signaling traffic.

20. The method of claim 16 wherein said traffic channel data of said first type corresponds to secondary traffic.

21. The method of claim 18 wherein said traffic channel data of said first type corresponds to signaling traffic.

22. The method of claim 18 wherein said traffic channel data of said first type corresponds to secondary traffic.

23. The method of claim 17 further comprising the step of including, within said formatted data frame, a reserved bit between said erasure indicator bit and said mixed mode bit.

24. The method of claim 17 wherein said traffic channel data of said first type corresponds to primary traffic and wherein said traffic channel data of said second type corresponds to signaling traffic.

25. The method of claim 17 wherein said traffic channel data of said first type corresponds to primary traffic and wherein said traffic channel data of said second type corresponds to secondary traffic.

26. The method of claim 23 wherein said traffic channel data of said first type corresponds to primary traffic and wherein said traffic channel data of said second type corresponds to signaling traffic.

27. The method of claim 23 wherein said traffic channel data of said first type corresponds to primary traffic and wherein said traffic channel data of said second type corresponds to secondary traffic.

28. The method of claim 17 further comprising the step of including, within said formatted data frame, a plurality of bits of traffic channel data of a third type between said plurality of bits of said traffic channel data of said second type and said one or more frame quality indicator bits.

29. The method of claim 23 further comprising the step of including, within said formatted data frame, a plurality of bits of traffic channel data of a third type between said plurality of bits of said traffic channel data of said second type and said one or more frame quality indicator bits.

30. The method of claim 28 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

31. The method of claim 29 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

32. In a communication system, a method for transmitting comprising the steps of:

provide a first data frame including primary traffic channel data;

generating a formatted data frame of a predetermined format, said formatted data frame sequentially including
an erasure indicator bit,
a mixed mode bit,
a plurality of bits of said primary traffic channel data,
one or more frame quality indicator bits, and
one or more tail bits;

encoding said formatted data frame; and transmitting said encoded formatted data frame.

33. The method of claim 32 further comprising the step of including, within said formatted data frame, a reserved bit between said erasure indicator bit and said mixed mode bit.

34. A transmitter for use in a communications system, said transmitter comprising:

means for providing a first data frame including traffic channel data of a first type;

means for generating a formatted data frame of a predetermined format using said first data frame, said formatted data frame including at least one frame quality bit;

means for encoding said formatted data frame at an encoding rate based upon a frame rate associated with said first data frame; and means for transmitting said encoded formatted data frame.

35. The transmitter of claim 34 further including means for inserting at least one tail bit into said formatted data frame.

36. The transmitter of claim 34 further including:

means for providing a second data frame including traffic channel data of a second type, and means for generating said formatted data frame using both said first and said second data frame.

37. The transmitter of claim 34 wherein said first type of traffic channel data corresponds to primary traffic data.

38. The transmitter of claim 36 wherein said first type of traffic channel data corresponds to primary traffic data, and wherein said second type of traffic channel data corresponds to secondary traffic data.

39. The transmitter of claim 36 wherein said first type of traffic channel data corresponds to primary traffic data, and wherein said second type of traffic channel data corresponds to signaling traffic data.

40. The transmitter of claim 36 further comprising means for including, within said formatted data frame:

at least one tail bit, an erasure indicator bit providing an indication of frame erasure, a mixed mode bit indicative of the inclusion of said second type of traffic channel data within said formatted data frame, and one or more frame mode bits for identifying said first and second types of traffic channel data.

41. The transmitter of claim 34 further comprising means for including, within said formatted data frame:

at least one tail bit, an erasure indicator bit providing an indication of frame erasure, and one or more frame mode bits for identifying said first type of traffic channel data.

42. The transmitter of claim 40 wherein said one or more frame mode bits further identify first and second frame rates respectively associated with said first and second types of traffic channel data.

43. The transmitter of claim 41 wherein said one or more frame mode bits further identify a frame rate associated with said first type of traffic channel data.

44. A transmitter for use in a communication system, said transmitter comprising:

means for providing a first data frame including traffic channel data of a first type;

means for generating a formatted data frame of a predetermined format, said formatted data frame sequentially including
an erasure indicator bit,
a mixed mode bit,
one or more frame mode bits,
a plurality of bits of said traffic channel data of said first type,
one or more frame quality indicator bits, and
one or more tail bits;

means for encoding said formatted data frame; and means for transmitting said encoded formatted data frame.

45. The transmitter of claim 44 further comprising means for including, within said formatted data frame, a plurality of bits of said traffic channel data of a second type between said plurality of bits of said traffic channel data of said first type and said one or more frame quality indicator bits.

46. The transmitter of claim 44 further comprising means for including, within said formatted data frame, a reserved bit between said erasure indicator bit and said mixed mode bit.

47. The transmitter of claim 44 wherein said traffic channel data of said first type corresponds to signaling traffic.

48. The transmitter of claim 44 wherein said traffic channel data of said first type corresponds to secondary traffic.

49. The transmitter of claim 46 wherein said traffic channel data of said first type corresponds to signaling traffic.

50. The transmitter of claim 46 wherein said traffic channel data of said first type corresponds to secondary traffic.

51. The transmitter of claim 45 further comprising means for including, within said formatted data frame, a reserved bit between said erasure indicator bit and said mixed mode bit.

52. The transmitter of claim 45 wherein said traffic channel data of said first type corresponds to primary traffic and wherein said traffic channel data of said second type corresponds to signaling traffic.

53. The transmitter of claim 45 wherein said traffic channel data of said first type corresponds to primary traffic and wherein said traffic channel data of said second type corresponds to secondary traffic.

54. The transmitter of claim 51 wherein said traffic channel data of said first type corresponds to primary traffic and wherein said traffic channel data of said second type corresponds to signaling traffic.

55. The transmitter of claim 51 wherein said traffic channel data of said first type corresponds to primary traffic and wherein said traffic channel data of said second type corresponds to secondary traffic.

56. The transmitter of claim 45 further comprising means for including, within said formatted data frame, a plurality of bits of traffic channel data of a third type between said plurality of bits of said traffic channel data of said second type and said one or more frame quality indicator bits.

57. The transmitter of claim 51 further comprising means for including, within said formatted data frame, a plurality of bits of traffic channel data of a third type between said plurality of bits of said traffic channel data of said second type and said one or more frame quality indicator bits.

58. The transmitter of claim 56 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

59. The transmitter of claim 57 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

60. In a communication system, a transmitter for transmitting information from a subscriber unit to a base station, said transmitter comprising:

means for providing a first data frame including primary traffic channel data;

means for generating a formatted data frame of a predetermined format, said formatted data frame sequentially including
an erasure indicator bit,
a mixed mode bit,
a plurality of bits of said primary traffic channel data,
one or more frame quality indicator bits, and
one or more tail bits;

means for encoding said formatted data frame; and means for transmitting said encoded formatted data frame.

61. The transmitter of claim 60 further comprising means for including, within said formatted data frame, a reserved bit between said erasure indicator bit and said mixed mode bit.

62. A system for communicating using formatted data, said system comprising:

a remote unit transmitter including:
means for providing a source of a first of type of traffic bits,
means for providing a first data frame including traffic channel data of a first type,
means for generating a formatted data frame of a predetermined format using said first data frame,
means for encoding said formatted data frame at an encoding rate based upon a frame rate associated with said first data frame, means for transmitting said encoded formatted data frame; and a base station for receiving said encoded formatted data frame transmitted by said remote unit transmitter.

63. The system of claim 62 wherein said remote unit transmitter further includes means for including, within said formatted data frame, a plurality of bits of said traffic channel data of a second type between said plurality of bits of said traffic channel data of said first type and said one or more frame quality indicator bits.

64. The system of claim 62 wherein said remote unit transmitter further comprises means for including, within said formatted data frame, a reserved bit between said erasure indicator bit and said mixed mode bit.

65. The system of claim 62 wherein said traffic channel data of said first type corresponds to signaling traffic.

66. The system of claim 62 wherein said traffic channel data of said first type corresponds to secondary traffic.

67. The system of claim 64 wherein said traffic channel data of said first type corresponds to signaling traffic.

68. The system of claim 64 wherein said traffic channel data of said first type corresponds to secondary traffic.

69. The system of claim 63 wherein said remote unit transmitter further comprises means for including, within said formatted data frame, a reserved bit between said erasure indicator bit and said mixed mode bit.

70. The system of claim 63 wherein said traffic channel data of said first type corresponds to primary traffic and wherein said traffic channel data of said second type corresponds to signaling traffic.

71. The system of claim 63 wherein said traffic channel data of said first type corresponds to primary traffic and wherein said traffic channel data of said second type corresponds to secondary traffic.

72. The system of claim 69 wherein said traffic channel data of said first type corresponds to primary traffic and wherein said traffic channel data of said second type corresponds to signaling traffic.

73. The system of claim 69 wherein said traffic channel data of said first type corresponds to primary traffic and wherein said traffic channel data of said second type corresponds to secondary traffic.

74. The system of claim 63 wherein said remote unit transmitter further comprises means for including, within said formatted data frame, a plurality of bits of traffic channel data of a third type between said plurality of bits of said traffic channel data of said second type and said one or more frame quality indicator bits.

75. The system of claim 69 wherein said remote unit transmitter further comprises means for including, within said formatted data frame, a plurality of bits of traffic channel data of a third type between said plurality of bits of said traffic channel data of said second type and said one or more frame quality indicator bits.

76. The system of claim 74 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

77. The system of claim 75 wherein said plurality of bits of traffic channel data of said first type correspond to primary traffic, said plurality of bits of traffic channel data of said second type correspond to signaling traffic, and said plurality of bits of traffic channel data of said third type correspond to secondary traffic.

\* \* \* \* \*

UNITED STATES PATENT AND TRADEMARK OFFICE
CERTIFICATE OF CORRECTION

PATENT NO.  : 5,568,483
DATED       : October 22, 1996
INVENTOR(S) : Padovani et al.

It is certified that error appears in the above-identified patent and that said Letters Patent is hereby corrected as shown below:

Drawings,
Sheet 1, Fig. 1, with reference to the "CODEC", change reference number "16" to
-- 14 --; with reference to the "VOCODER", change reference number "14" to -- 16 --.

Column 2,
Line 15, change "flames" to -- frames --;

Column 3,
Line 44, after "functioning in" insert -- a --;

Column 13,
Line 53, change "flames" to -- frames --;

Column 16,
Line 16, change "10a-10y" to -- 9a-9y --;
Line 24, change "10b" to -- 9b --;
Line 36, change "10c" to -- 9c --;
Line 45, change "10d" to -- 9d --;
Line 54, change "10e" to -- 9e --;
Line 61, change "10f" to -- 9f --;
Line 66, change "10g" to -- 9g --;

Column 17,
Line 5, change "10h" to -- 9h --;
Line 10, change "10i" to -- 9i --;
Line 15, change "10j" to -- 9j --;
Line 20, change "10k" to -- 9k --;
Line 26, change "10l" to -- 9l --;
Line 31, change "10m" to -- 9m --;
Line 36, change "10n" to -- 9n --;
Line 44, change "10o" to -- 9o --;
Line 53, change "10p" to -- 9p --;
Line 62, change "10q" to -- 9q --;

UNITED STATES PATENT AND TRADEMARK OFFICE
CERTIFICATE OF CORRECTION

PATENT NO. : 5,568,483
DATED : October 22, 1996
INVENTOR(S) : Padovani et al.

It is certified that error appears in the above-identified patent and that said Letters Patent is hereby corrected as shown below:

Column 18,
Line 1, change "10r" to -- 9r --;
Line 10, change "10s" to -- 9s --;
Line 16, change "10t" to -- 9t --;
Line 22, change "10u" to -- 9u --;
Line 27, change "10v" to -- 9v --;
Line 34, change "10w" to -- 9w --;
Line 40, change "10x" to -- 9x --;
Line 45, change "10y" to -- 9y --; and Column 19,
Line 32, after "included" insert -- in --.

Signed and Sealed this

Thirtieth Day of August, 2005

JON W. DUDAS
*Director of the United States Patent and Trademark Office*

Disclaimer 5,568,483 — Roberto Padovani; Edward G. Tiedemann, Jr., both of San Diego; Joseph P. Odenwalder, Del Mar, all of CA; Ephraim Zehavi, Haifa, Israel; Charles E. Wheatley, III, Del Mar, CA. METHOD AND APPARATUS FOR THE FORMATTING OF DATA FOR TRANSMISSION. Patent dated Oct. 22, 1996. Disclaimer filed Dec. 08, 2006, by the Assignee, Qualcomm Incorporated.

Hereby enter this disclaimer to claims 1, 2, 3 and 5 of said patent.
*(Official Gazette March 27, 2007)*